(12) United States Patent
Harif

(10) Patent No.: US 9,656,323 B2
(45) Date of Patent: May 23, 2017

(54) CUTTING TOOL WITH COOLING MECHANISM AND A CUTTING INSERT AND TOOL HOLDER THEREFOR

(75) Inventor: Gershon Harif, Ramat Gan (IL)

(73) Assignee: NO SCREW LTD., Holon (IL)

( * ) Notice: Subject to any disclaimer, the term of this patent is extended or adjusted under 35 U.S.C. 154(b) by 752 days.

(21) Appl. No.: 13/989,138

(22) PCT Filed: Nov. 23, 2011

(86) PCT No.: PCT/IL2011/050024
§ 371 (c)(1),
(2), (4) Date: May 23, 2013

(87) PCT Pub. No.: WO2012/070046
PCT Pub. Date: May 31, 2012

(65) Prior Publication Data
US 2013/0251463 A1    Sep. 26, 2013

Related U.S. Application Data

(60) Provisional application No. 61/417,020, filed on Nov. 24, 2010.

(51) Int. Cl.
*B23B 27/10* (2006.01)
*B23B 27/04* (2006.01)
(Continued)

(52) U.S. Cl.
CPC ............ *B23B 27/10* (2013.01); *B23B 27/04* (2013.01); *B23B 27/145* (2013.01); *B23B 51/06* (2013.01);
(Continued)

(58) Field of Classification Search
CPC ....... B23B 7/02; B23B 2250/12; B23B 27/10; B23B 27/145; B23Q 11/10; B23Q 11/1023; B23C 2250/12; B23C 5/28
(Continued)

(56) References Cited

U.S. PATENT DOCUMENTS 2,870,523 A * 1/1959 Richard .............. B23B 27/1629
407/107
3,077,802 A * 2/1963 Philip ..................... B23B 27/10
407/11
(Continued)

FOREIGN PATENT DOCUMENTS

| CN | 1372499 | 10/2002 |
|---|---|---|
| CN | 1512928 | 7/2004 |

(Continued)

OTHER PUBLICATIONS

International Search Report from International Application No. PCT/IL2011/050024 mailed Apr. 2, 2012.

*Primary Examiner* — Sara Addisu
(74) *Attorney, Agent, or Firm* — Dorsey & Whitney LLP

(57) ABSTRACT

A cutting element includes a cutting portion and a cooling portion. The cutting portion has a rake surface, a relief surface and a cutting edge defined at the intersection between the rake surface and the relief surface. The cooling portion has an operative surface and a cooling nozzle integrally formed therewith. The nozzle is spaced from the cutting edge and having a cooling aperture directed at the cutting edge at an acute angle with respect to the rake surface. The operative surface is one of the rake surface and a surface of the cutting element other than the rake surface, disposed at a location more remote from the cutting edge than the rake surface, so that the rake surface is disposed between the cutting edge and the cooling aperture.

14 Claims, 21 Drawing Sheets

(51) Int. Cl.
*B23B 27/14* (2006.01)
*B23B 51/06* (2006.01)
*B23C 5/28* (2006.01)

(52) U.S. Cl.
CPC ............ *B23C 5/28* (2013.01); *B23B 2205/16* (2013.01); *B23B 2250/12* (2013.01); *B23C 2250/12* (2013.01); *Y10T 407/14* (2015.01)

(58) Field of Classification Search
USPC ...................................... 407/11; 408/56, 57
See application file for complete search history.

(56) References Cited

U.S. PATENT DOCUMENTS

| | | | | |
|---|---|---|---|---|
| 3,323,195 | A * | 6/1967 | Vanderjagt | B23Q 11/10 407/11 |
| 3,889,520 | A * | 6/1975 | Stoferle | B23Q 17/09 407/11 |
| 4,535,216 | A * | 8/1985 | Cassidenti | B23B 1/00 219/68 |
| 4,606,248 | A * | 8/1986 | Shikata | B23B 27/10 407/114 |
| 4,621,547 | A * | 11/1986 | Yankoff | B23B 27/167 407/11 |
| 4,795,292 | A * | 1/1989 | Dye | B23Q 1/0036 279/20 |
| 5,340,242 | A * | 8/1994 | Armbrust | B23B 25/02 407/11 |
| 5,346,335 | A * | 9/1994 | Harpaz | B23B 27/045 407/11 |
| 5,775,854 | A | 7/1998 | Werthelm | |
| 5,901,623 | A | 5/1999 | Hong | |
| 6,299,388 | B1 * | 10/2001 | Slabe | B23B 27/10 407/100 |
| 6,312,199 | B1 * | 11/2001 | Sjoden | B23B 27/10 407/11 |
| 6,705,805 | B2 * | 3/2004 | Lagerberg | B23B 27/10 407/11 |
| 6,708,590 | B2 | 3/2004 | Lagerberg | |
| 7,252,024 | B2 | 8/2007 | Zurecki et al. | |
| 7,634,957 | B2 | 12/2009 | Ghosh et al. | |
| 7,934,891 | B2 | 5/2011 | Jonsson et al. | |
| 7,955,032 | B2 * | 6/2011 | Nelson | B23B 27/10 407/11 |
| 7,959,384 | B2 | 6/2011 | Breisch | |
| 8,007,208 | B2 * | 8/2011 | Noureddine | B23B 27/10 407/103 |
| 8,827,598 | B2 * | 9/2014 | Henry | B23B 27/04 407/11 |
| 8,827,599 | B2 * | 9/2014 | Henry | B23B 27/10 407/11 |
| 8,978,527 | B2 * | 3/2015 | Yang | B23B 27/002 407/11 |
| 2001/0007215 | A1 * | 7/2001 | Murata | B23B 27/10 83/16 |
| 2002/0106250 | A1 * | 8/2002 | Murakawa | B23B 27/10 407/11 |
| 2003/0110781 | A1 * | 6/2003 | Zurecki | B23Q 11/1053 62/64 |
| 2004/0240949 | A1 * | 12/2004 | Pachao-Morbitzer | B23B 27/065 407/11 |
| 2006/0263153 | A1 * | 11/2006 | Isaksson | B23B 27/065 407/113 |
| 2007/0286689 | A1 * | 12/2007 | Giannetti | B23B 27/10 407/11 |
| 2008/0124180 | A1 * | 5/2008 | Breisch | B23B 27/10 407/110 |
| 2008/0131215 | A1 * | 6/2008 | Sjoo | B23B 27/04 407/110 |
| 2008/0175677 | A1 * | 7/2008 | Prichard | B23C 5/2273 407/11 |
| 2008/0175678 | A1 * | 7/2008 | Prichard | B23B 27/10 407/11 |
| 2008/0279644 | A1 * | 11/2008 | Endres | B23B 27/10 408/56 |
| 2009/0142150 | A1 | 6/2009 | Chu | |
| 2009/0320655 | A1 * | 12/2009 | Grant | B23B 27/10 82/50 |
| 2010/0175519 | A1 * | 7/2010 | Deschenaux | B23B 29/043 82/1.11 |
| 2010/0196105 | A1 * | 8/2010 | Amstibovitsky | B23B 27/10 407/11 |
| 2010/0254772 | A1 * | 10/2010 | Rozzi | B23B 27/10 407/11 |
| 2010/0272529 | A1 * | 10/2010 | Rozzi | B23C 5/207 408/56 |
| 2011/0020073 | A1 * | 1/2011 | Chen | B23B 27/10 407/11 |
| 2011/0070037 | A1 * | 3/2011 | Baker | B23B 27/10 407/11 |
| 2011/0229277 | A1 * | 9/2011 | Hoffer | B23B 27/10 407/11 |
| 2011/0299944 | A1 * | 12/2011 | Hofermann | B23B 27/10 407/11 |
| 2012/0082518 | A1 * | 4/2012 | Woodruff | B23C 5/109 407/11 |
| 2013/0078043 | A1 * | 3/2013 | Henry | B23B 27/1622 407/11 |
| 2013/0195569 | A1 * | 8/2013 | Gey | B28B 1/002 407/113 |
| 2015/0321262 | A1 * | 11/2015 | Kondameedi | B23B 27/005 407/115 |

FOREIGN PATENT DOCUMENTS

| | | | | |
|---|---|---|---|---|
| CN | 201529778 | | 7/2010 | |
| DE | 3004166 | | 8/1980 | |
| DE | 102006035182 | A1 * | 1/2008 | ............ B23B 27/10 |
| EP | 0791420 | | 8/1997 | |
| FR | 1115922 | | 5/1956 | |
| JP | 60127904 | A * | 7/1985 | |
| JP | 4183503 | | 6/1992 | |
| JP | 05116008 | A * | 5/1993 | |
| JP | 07266103 | A * | 10/1995 | |
| JP | 07266104 | A * | 10/1995 | |
| JP | 08025111 | A * | 1/1996 | |
| JP | 2001198708 | A * | 7/2001 | |
| JP | 2005279900 | A * | 10/2005 | |
| JP | 2006088297 | A * | 4/2006 | |
| JP | 2009107027 | A * | 5/2009 | |
| JP | 2010105084 | A * | 5/2010 | |
| RU | 2005577 | | 1/1994 | |
| SU | 1816650 | A1 | 5/1993 | |

* cited by examiner

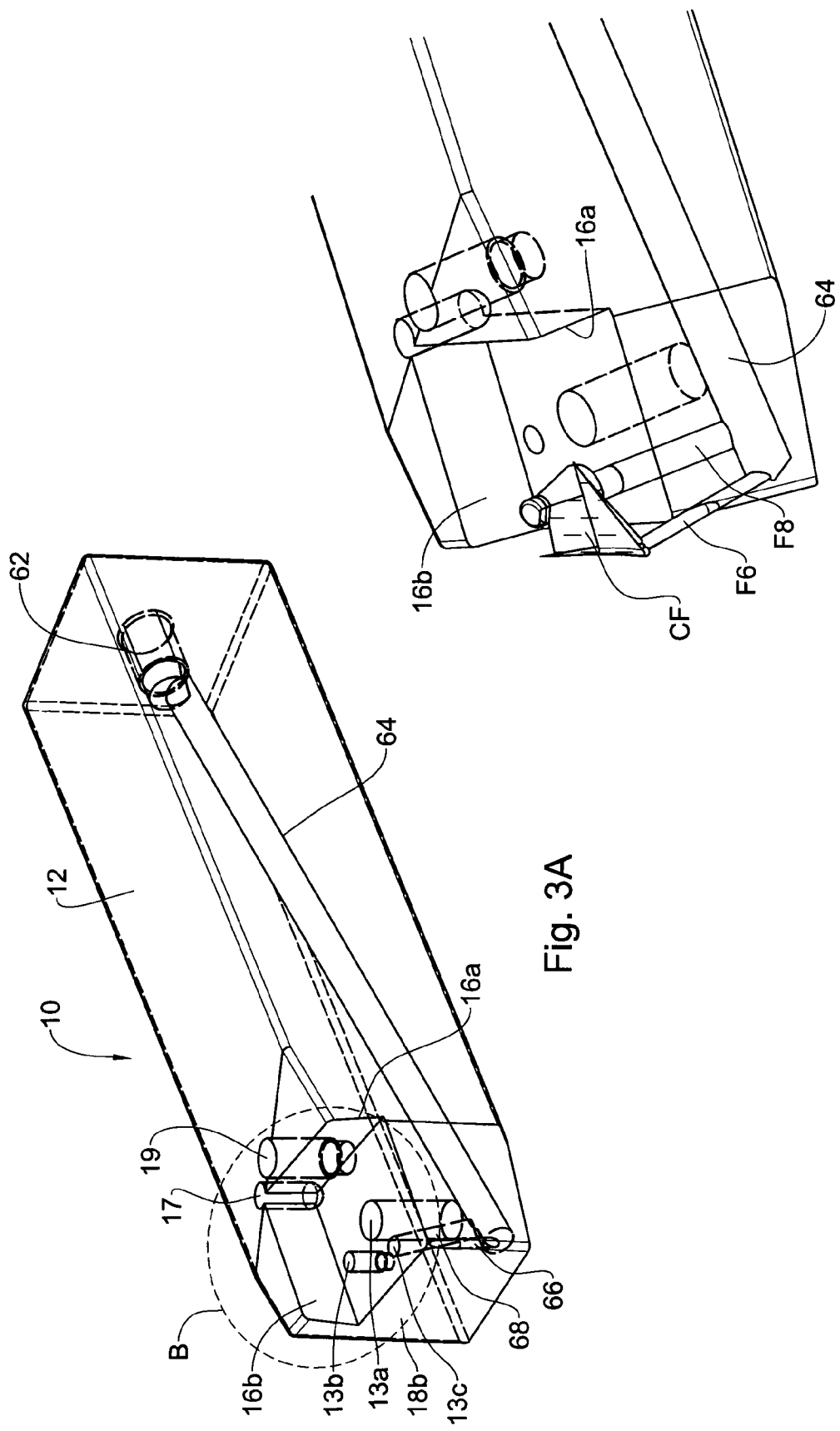

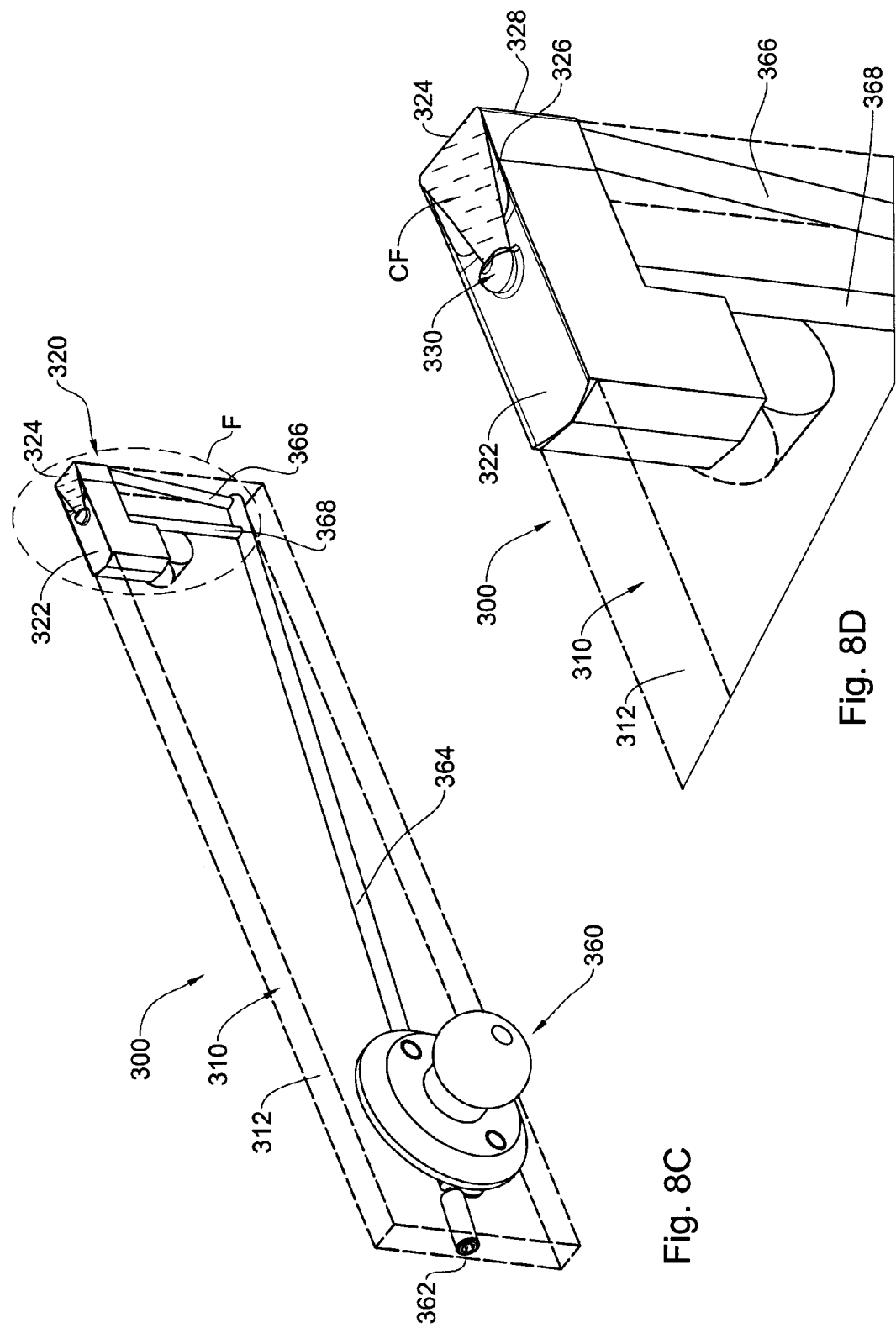

CUTTING TOOL WITH COOLING MECHANISM AND A CUTTING INSERT AND TOOL HOLDER THEREFOR

FIELD OF THE INVENTION

This invention relates to cutting tools and cutting inserts, in particular, cutting tools comprising a cooling mechanism.

BACKGROUND OF THE INVENTION

It is known in the art to provide a cooling fluid to a cutting interface between a cutting tool and a workpiece during a cutting operation. The provision of the cooling fluid allows reducing the heat generated at the cutting interface during the cutting operation and thereby preventing damage to both the cutting edge and the workpiece.

In general, a cutting tool has a rake face and a relief face, defining at the intersection thereof a cutting edge of the cutting tool.

Cooling fluid is generally provided to the cutting interface either from the side of the rake face or from the side of the relief face or from both.

In some examples, cutting inserts used in cutting tools are preformed with apertures configured for the provision of a cooling fluid. In other examples, cutting tools and/or cutting tool holders are provided with a cooling arrangement separate from the cutting insert, which is configured for provision of the cooling fluid.

Examples of cooling arrangements as discussed above are disclosed, for example, in EP0791420, U.S. Pat. No. 5,346,335, U.S. Pat. No. 5,775,854, U.S. Pat. No. 5,901,623, U.S. Pat. No. 6,705,805, U.S. Pat. No. 7,634,957, U.S. Pat. No. 7,934,891 and U.S. Pat. No. 7,959,384.

SUMMARY OF THE INVENTION

According to one aspect of the subject matter of the present application, there is provided a cutting element comprising a cutting portion and a cooling portion, said cutting portion having a rake surface, a relief surface and a cutting edge defined at the intersection between the rake surface and the relief surface, said cooling portion having an operative surface and a cooling nozzle integrally formed therewith, said nozzle being spaced from said cutting edge and having a cooling aperture directed at the cutting edge at an acute angle with respect to the rake surface, said operative surface being one of:

said rake surface; and a surface of the cutting element other than the rake surface, disposed at a location more remote from the cutting edge than the rake surface, so that said rake surface is disposed between the cutting edge and the cooling aperture.

According to a specific design, the nozzle can have at least one side wall extending transverse to said operative surface and upper face extending transverse to said side wall so that said cooling aperture is delimited by said operative surface, said side wall and said upper face.

The arrangement can be such that said upper face is elevated over said operative surface. In particular, said upper face can be oriented angled with respect to said operative surface at an acute angle such that cooling fluid emitted from said nozzle is emitted towards said operative surface.

One advantage which may arise from the above design is that the angled orientation of the upper surface provides more pressure to the emitted cooling fluid, and thereby increasing its efficiency in cooling the cutting interface between the cutting element and the workpiece.

The cutting element can have a top face and a bottom face and at least one side face extending therebetween, said nozzle being located at one of said top face and said bottom face, said cutting element being further formed with a cooling channel extending between said bottom face and said top face and being in fluid communication with said nozzle for provision of a cooling fluid thereto.

The cooling channel can be formed with a top opening at said top face and a bottom opening at said bottom face, one of which openings is associated with said nozzle and having a first cross-sectional area and the other of the openings having a second cross-sectional area greater than said first cross-sectional area.

In particular, the cooling channel can have a conical configuration with the wide end of the cone being spaced from the nozzle. Thus, at least one advantage which may arise from the above design is increased pressure of the cooling fluid as it is being pushed through a gradually decreasing cross-sectional area.

On additional advantage which may arise from the design of the cooling channel lies in the fact that when passing through the channel, even before being emitted through the nozzle, the cooling fluid can already absorb some of the heat of the cutting insert from within, thereby contributing to cooling of the cutting edge.

The cutting element can be formed with two or more cutting portions and two or more cooling portions having respective nozzles associated with some of said cutting portions. Specifically, the cutting element can have a number n of cutting portions and a respective number of cutting edges, each cutting portion being associated with at least one cooling portion and its respective nozzle.

According to a particular example, the cutting element can be formed with four cutting edges and four respective nozzles, all cutting portions being formed on the same face of the cutting element.

The cutting element can be in the form of a cutting insert configured for mounting onto a cutting tool holder to form a cutting tool.

According to a particular design, the cutting insert can be indexible and/or reversible.

According to one example, the cutting insert can be formed with at least one cutting portion associated with a top face thereof and at least one cutting portion associated with a bottom face thereof, each of the cutting portions being provided with its respective cooling portion and corresponding nozzle.

In the above example, the cutting insert can have a first nozzle formed at the top face thereof and having a respective cooling channel extending between said bottom face and said top face and a second nozzle formed at a bottom face of the cutting insert having a respective cooling channel extending between the top face and the bottom face.

Specifically, the cutting insert can have four cutting portions at a top face thereof and four cutting portions at a bottom face thereof, each of the cutting portions being provided with its respective cooling portion and nozzle.

The cutting element can be configured for at least one of the following cutting operations: milling, turning, sawing and cutting.

The cutting element can be manufactured by a single pressing process.

According to another aspect of the subject matter of the present application, there is provided a mold for the manufacture of a cutting element of the first aspect of the present application.

According to yet another aspect of the subject matter of the present application, there is provided a cutting tool holder configured for mounting thereon a cutting element of the previous aspect to form a cutting tool, said cutting tool holder being formed with an insert seat and a cooling fluid provision arrangement having at least one cooling passage in fluid communication with said insert seat.

The insert seat can be formed with a base surface having a cooling bore being in fluid communication with said cooling passage, said cooling bore being configured for being in fluid communication with a cooling portion of said cutting element when the latter is mounted to the cutting tool holder.

The cutting tool holder can also be formed with two side faces extending transverse to said base surface forming a corner edge at an intersection of the two side faces, said cutting tool holder being formed with an auxiliary cooling aperture directed towards said base surface, so that when said cutting insert is mounted onto said cutting tool holder, said base surface is disposed between said auxiliary cooling aperture and the cutting insert.

In particular, the cooling aperture can be formed on at least one of the following:
one of said side faces; and
said corner edge.

The cooling fluid provision arrangement can be formed with a first cooling branch being in fluid communication with said cooling bore and a second cooling branch being in fluid communication with said auxiliary cooling aperture.

The cooling passage of the cooling fluid provision arrangement can have an inlet end configured for attachment thereto of a cooling fluid supply. In particular, said inlet end can be configured for fixed attachment of an outlet end of a supply conduit thereto. Alternatively, it can be configured for freely positioning therein an outlet end of a supply conduit.

According to a specific example, the cooling fluid provision arrangement can comprise a first passage and a second passage, each being in fluid communication with said base surface, the inlet end of said first passage being configured for fixed attachment of an outlet end of a supply conduit thereto and the inlet end of said second passage being configured for freely receiving therein an outlet end of a supply conduit.

The base surface of the cutting tool holder can be formed with recesses configured for receiving therein nozzles of the cutting element which are located on a face of the cutting insert which is mated to the base surface when the cutting insert is mounted onto the cutting tool holder.

According to another aspect of the subject matter of the present application, there is provided a cutting tool a cutting element and a cutting tool holder according to the previous aspects of the subject matter of the present application.

According to still another aspect of the subject matter of the present application, there is provided an integral cutting tool configured for revolving about a central axis thereof, said cutting tool being formed with at least one cutting portion having a rake surface, a relief surface and a cutting edge formed at the intersection between said rake surface and said relief surface, said cutting tool being further provided with a cooling fluid provision arrangement having at least one passage and an opening formed at the relief surface, said opening being directed towards the cutting edge at an acute angle.

The integral cutting tool can be formed with a plurality of cutting portions and a corresponding plurality of chip evacuation channels formed between each two neighboring cutting portions, said cooling aperture being located such that said cutting edge is disposed between said cooling aperture and its corresponding chip evacuation channel.

The integral cutting tool can be used for milling or drilling.

According to other aspects of the subject matter of the present application, there is provide:
a revolving cutting tool comprising a cutting portion having:
a rake surface;
a relief surface; and
a cutting edge defined at the intersection between the rake surface and the relief surface;
wherein said cutting tool is further formed with a cooling aperture having a longitudinal axis which is directed towards the cutting edge at an acute angle with respect to the relief surface, said cooling aperture being located on either one of the following:
said relief surface at a location spaced from said cutting edge; and
a surface other than said relief surface, at a location more remote from the cutting edge than the relief surface, so that said relief surface is disposed between the cutting edge and the cooling aperture.

According to one example, the cutting tool can be an integral cutting tool in which the rake surface, relief surface and cutting edge are integrally formed with the cutting portion of the cutting tool. In this case, the cooling aperture can be formed on the relief surface itself.

Alternatively, according to another example, the cutting tool can be constituted by a cutting tool holder and a cutting insert, the cutting insert being formed with the rake surface, relief surface and cutting edge. In this case, the cooling aperture can be formed on a surface other than the relief surface.

In particular, the cutting insert can be formed with:
A bottom surface;
A top surface; and
At least one side surface extending between the bottom surface and the top surface;
The design can be such that said top surface is configured to constitute the rake surface, said at least one side surface is configured to constitute said relief surface, and said cutting edge is defined at the intersection between the top surface and the side surface.

In addition, the cutting tool holder can be formed with an insert seat configured for receiving therein the cutting insert, said insert seat being formed with
a seat surface;
at least one side surface transverse to said seat surface; and
a rim defined at the intersection between the seat surface and the side surface;

The arrangement is such that when the cutting insert is mounted onto the cutting tool holder, it is received within the seat so that the bottom surface thereof is mated against the seat surface of the cutting tool holder.

In this position, the cutting edge of the cutting insert is spaced from said rim, and the side surface of the cutting insert and the side surface of the tool holder are generally aligned with one another.

According to the above example, the cooling aperture can be formed on the side surface of the cutting tool holder, and being directed towards the cutting edge of the cutting insert, when the latter is mounted onto the cutting tool holder.

According to another aspect of the subject matter of the present application, there is provided a cutting tool comprising a cutting portion having:
A rake surface;
A relief surface; and
A cutting edge defined at the intersection between the rake surface and the relief surface;
Wherein, said rake surface comprises a cooling nozzle formed with a cooling aperture having a longitudinal axis which is directed at an acute angle towards the cutting edge with respect to the rake surface, said cooling aperture being located on either one of the following:
Said rake surface spaced from said cutting edge; and
A surface other than the rake surface, at a location more remote from the cutting edge than the rake surface, so that said rake surface is disposed between the cutting edge and the cooling aperture.

According to still another aspect of the subject matter of the present application, there is provided a mold for the manufacture of a cutting insert used in the cutting tool of the previous aspect of the application.

According to yet another aspect of the subject matter of the present application, there is provided a cutting tool configured for removing material from a workpiece, said cutting tool having an attachment portion and a cutting portion, said cutting portion being formed with at least one cooling channel configured for providing a cooling fluid to the interface between said cutting tool and said workpiece, said channel having at least one inlet at said attachment portion and at least one outlet at said cutting portion, and wherein said inlet is configured for freely receiving therein a nozzle for providing said channel with said cooling fluid.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 3A is a schematic isometric view of a turning tool holder used in the turning tool shown in FIG. 1A, the holder being shown transparent for clearer understanding of its inner structure;

FIG. 3B is a schematic enlarged view of a detail B of the turning tool holder shown in FIG. 3A;

FIG. 8C is a schematic rear isometric view of the severing tool shown in FIG. 8A, with a severing tool holder thereof is shown transparent for clearer understanding of the inner structure thereof;

FIG. 8D is a schematic enlarged view of a detail F of the severing tool shown in FIG. 8C;

DETAILED DESCRIPTION OF EMBODIMENTS

Figure 1A:
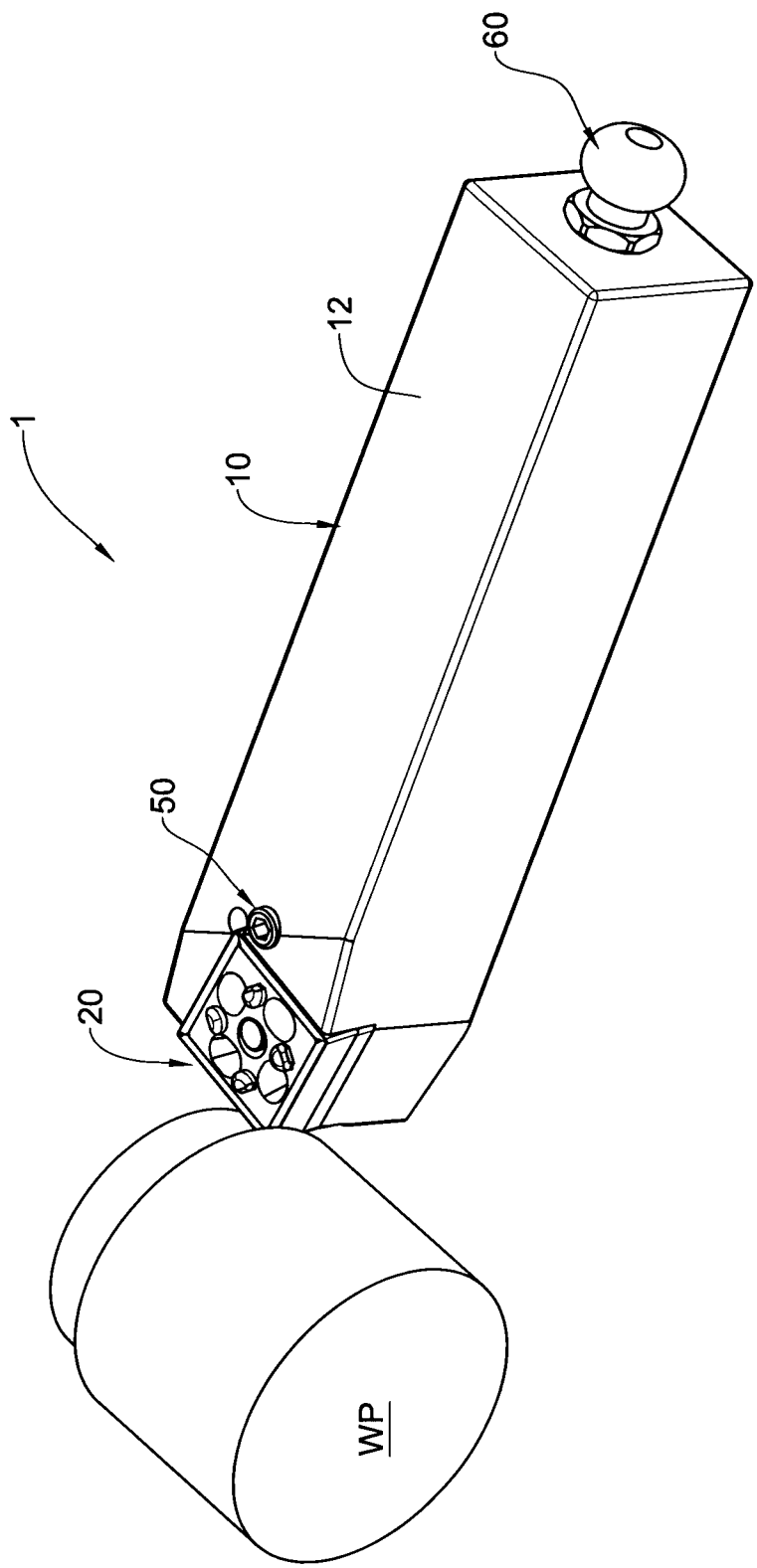
FIG. 1A is a schematic rear isometric view of a turning tool according to the subject matter of the present application, during a cutting process on a workpiece.

With reference to FIGS. 1A to 1E, there is provided a turning tool generally designated as 1, comprising a cutting tool holder 10, a cutting insert 20, a support member 40, a fastening arrangement 50 and a Cooling Fluid Provision (CFP) system 60.

The cutting tool holder 10 comprises a body 12 formed with an insert seat configured for receiving therein the cutting insert 20. The seat is formed with a base surface 14 and two side surfaces 16a and 16b. The base surface 14 is in turn formed with a central opening 13a configured for centering the cutting insert 20 when mounted onto the cutting tool 10, a cooling aperture 13b configured for providing a cooling fluid to the cutting insert 20 and a fastening aperture 13c configured for receiving a member of the fastening arrangement 50.

In addition, the body 12 of the cutting tool holder 10 is formed with two transverse walls 18a and 18b bordering the base surface 14, and forming therebetween an edge E. The edge E is filleted, and is formed, at a location below the base surface 12 with a first cooling aperture $CA_1$. As more clearly shown in FIGS. 1D and 1E, the cooling aperture has a central axis y, which is angled to the edge E at an acute angle θ.

With particular reference being made to FIGS. 2A to 2D, the cutting insert 20 is formed with a top face 22T, a bottom face 22B and four side walls 28 extending therebetween. Both the top face 22T and the bottom face 22B are formed with a rake surface 26 extending along the perimeter thereof. A cutting edge 24 is defined at the intersection between each rake surface 26 and the side walls 28 serving as relief surfaces. Since the cutting insert 20 is rectangular, eight cutting edges 24 can be defined, four at the top face 22T and four at the bottom face 22B.

The cutting insert 20 is further formed with a central opening 25 configured for receiving therein a member of the fastening arrangement 50 of the cutting tool 1. The central opening 25 also defines a central axis X of the cutting insert 20.

The cutting insert 20 is also formed with eight cooling passages 30, the first four configured for cooling the four cutting edges 24 of the top face 22T, and the other four configured for cooling the four cutting edges 24 of the bottom face 22B.

Each passage 30 is in the form of a channel extending between the top face 22T and the bottom face 22B, each having an inlet end 33 and an outlet end in the form of a nozzle 32. The first four passages 30 have their inlet end 33 at the bottom surface 22B and their nozzle 32 at the top surface 22T. The other four passages 30 are arranged at exactly the opposite way (inlet at top and outlet at bottom).

The nozzles 32 of each passage 30 are formed with a cooling aperture $CA_2$ which is pointed directly at the cutting edge 24 to which the respective cooling passage 30 belongs. The cross-section of the cooling aperture $CA_2$ is fairly small, causing a cooling fluid passing therethrough to squirt out at considerable pressure directly towards the cutting edge 24.

Figures 1B, 1F:
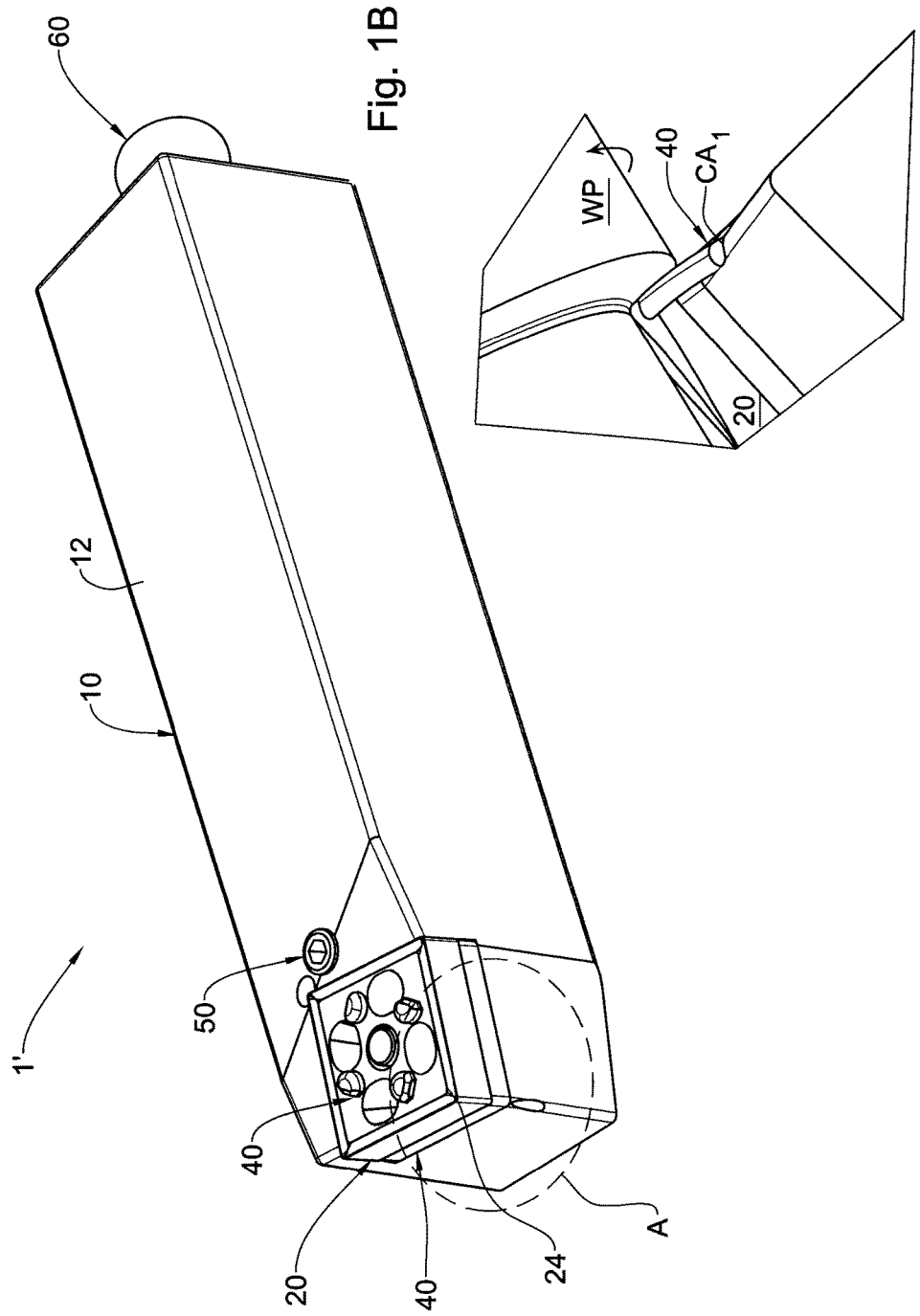
FIG. 1B is a schematic front isometric view of the turning tool shown in FIG. 1A.
FIG. 1F is a schematic bottom isometric view of the cutting tool shown in FIG. 1E.
Figure 1C:
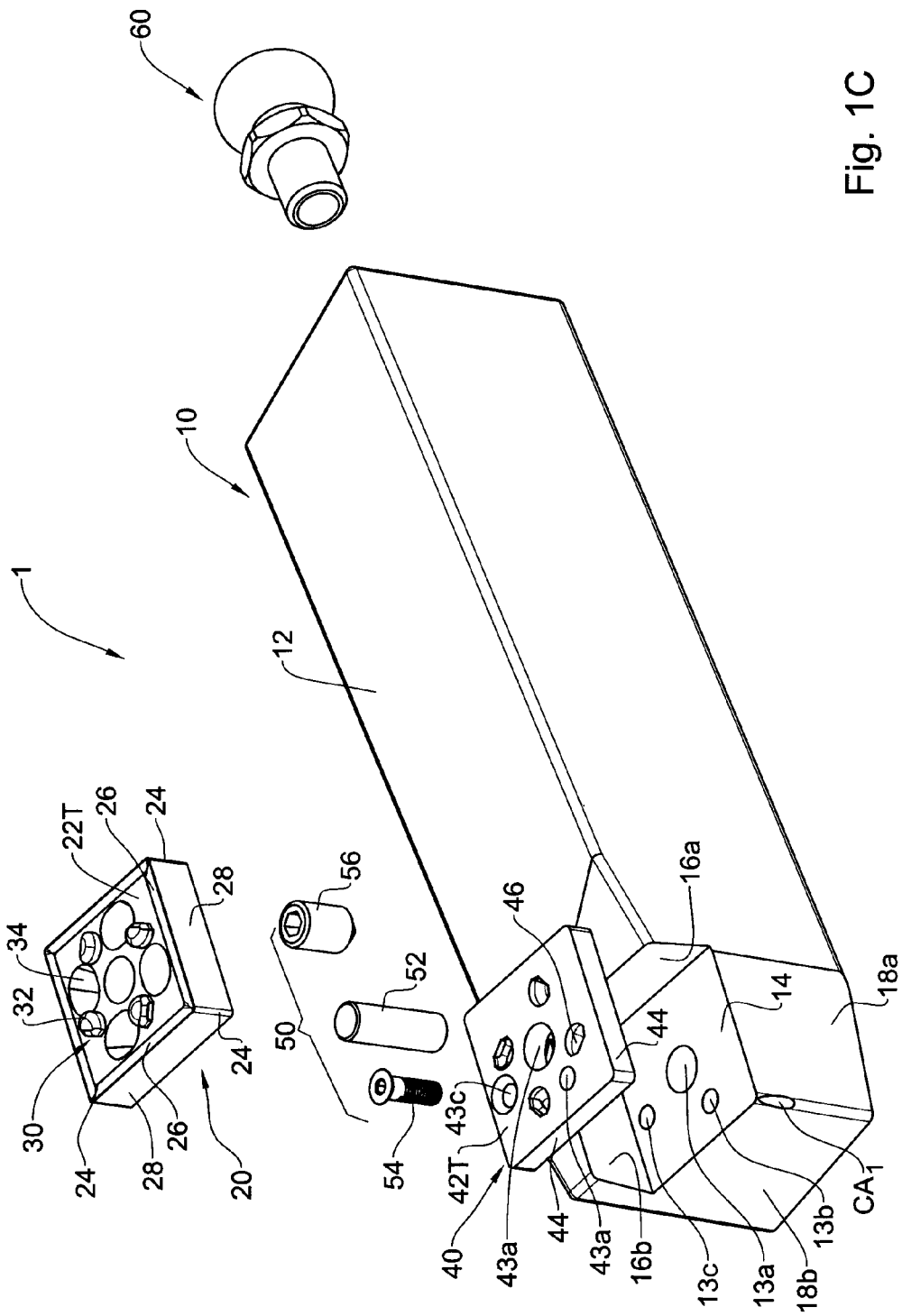
FIG. 1C is a schematic exploded isometric view of the turning tool shown in FIG. 1B.
Figure 1D:
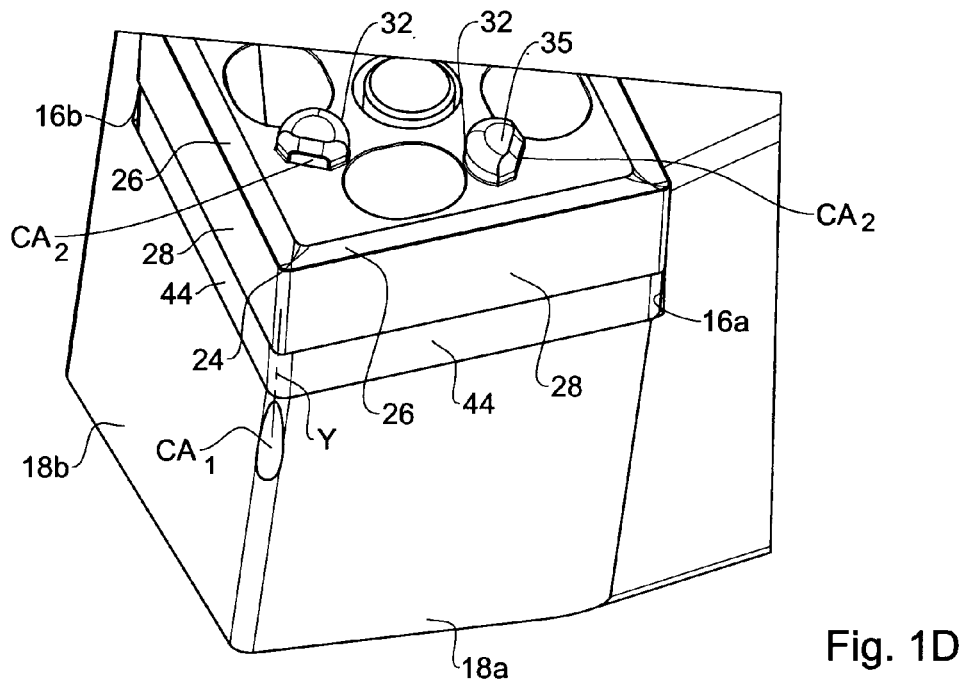
FIG. 1D is a schematic enlarged view of a detail A of the turning tool shown in FIG. 1B.
Figure 1E:
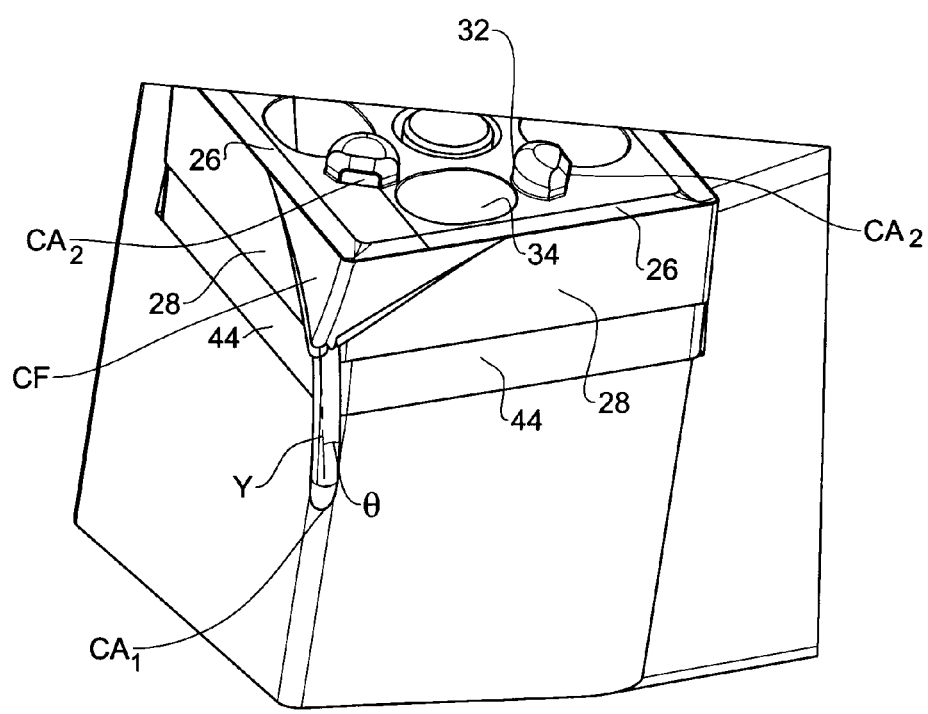
FIG. 1E is a schematic top isometric view of the cutting tool shown in FIG. 1A during a cutting operation.
Figure 2A:
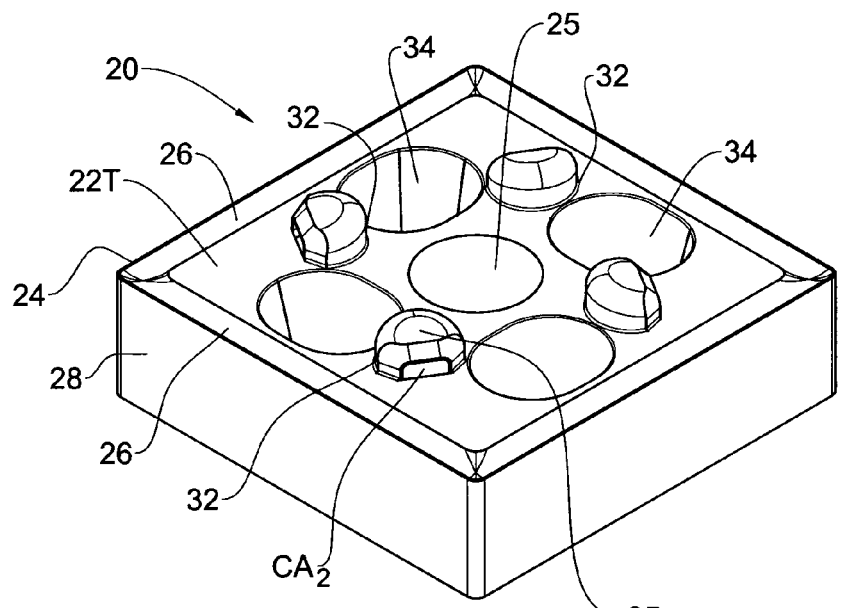
FIGS. 2A to 2C are schematic isometric, top and front views of a cutting inserts used in the turning tool shown in FIG. 1A.
Figure 2B:
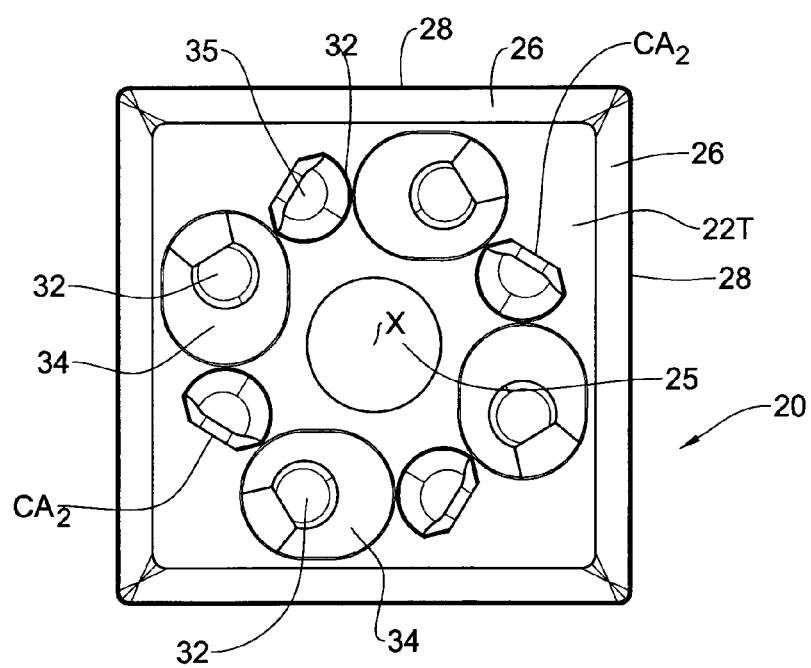
Figure 2C:
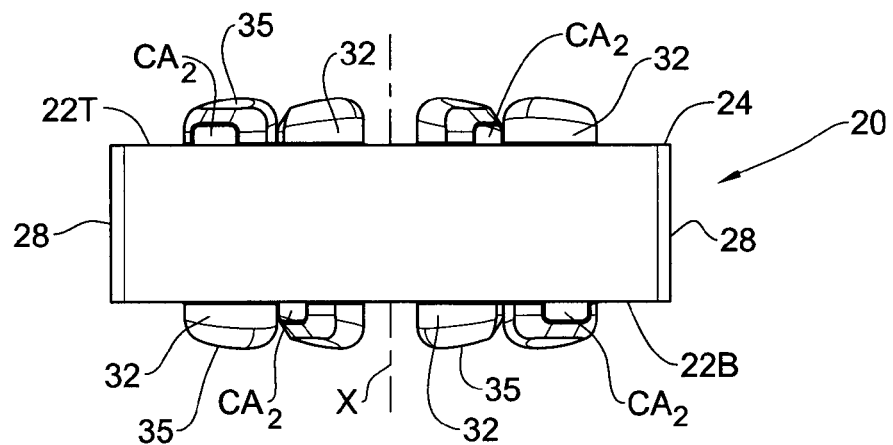
Figure 2D:
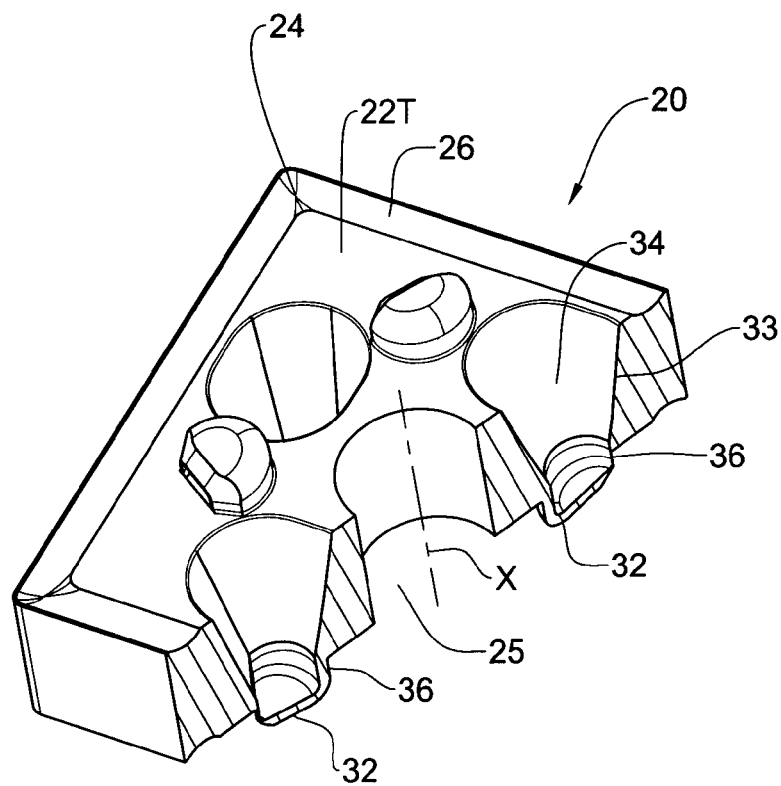
FIG. 2D is a schematic isometric cross-sectional view of the cutting insert shown in FIGS. 2A to 2C.

In addition, it is observed that the cooling passages 30 are of conical shape, the inlet end 33 being of greater diameter that the nozzle 32 and the cooling aperture $CA_2$, further serving to increase the pressure of the cooling fluid upon emission from the nozzle 32 (see explanations in connection with FIGS. 1D and 1E). Also, the top surface 35 of the nozzle 32 is slightly slanted, so as to cause the fluid emitted from the nozzle 32 to flow downwards towards the rake surface 26 and so directly to the cutting edge 24.

In mounting of the cutting insert 20 onto the cutting tool holder 10, a support plate 40 is used, configured for being received between the base surface 14 of the cutting tool holder 10 and the bottom surface 22B of the cutting insert.

The support plate 40, similarly to the cutting insert 20, is formed with a central hole 43a configured for receiving therein a member of the fastening arrangement 50, and a secondary hole 43c configured for receiving therein another member of the fastening arrangement 50. The support plate 40 is also formed with a cooling fluid aperture 43b, configured for allowing cooling fluid to pass from the cutting tool holder 10 into the cutting insert 20. In addition, the support plate 40 is formed with four recesses 46, configured for receiving the nozzles 32 of the cutting insert 20, when the latter is mounted onto the cutting tool holder 10.

In assembly, the support plate 40 is mounted onto the seat of the cutting tool holder 10, and the cutting insert 20 is positioned over the support plate 40, so that the nozzles 32 of the bottom face 22B are received within the recesses 46. In this position, the holes 13a, 43a and 25 are aligned with one another allowing receiving therein the center pin 52 of the fastening arrangement 50.

In the mounting position, the operative cutting edge 24 of the cutting tool is aligned with the corner formed between the surfaces 18a and 18b. Consequently, the operative cooling channel 30 is the one facing the operative cutting edge. In the mounted position, the inlet end 33 of the operative cooling channel 30 of the cutting insert 20, is aligned with the cooling aperture 13b, allowing provision of cooling fluid into the cutting insert 20.

Specific attention is now drawn to FIGS. 3A and 3B, in which the CFP system 60 is shown. The CFP system 60 is in the form of a channel arrangement comprising a main channel 64 having an inlet end 62 at an end of the cutting tool holder 10 which is remote from the insert seat, and two outlet branches 66 and 68, associated with the cooling apertures $CA_1$ and $CA_2$ respectively.

It is noted that the inlet end 62 of the CFP system 60 is configured for articulation thereto of a fluid conduit (tube, pipe etc. not shown) configured for providing the channel 64 with the cooling fluid. However, as will be described later with respect to FIG. 6, the inlet end 62 can be a simple opening for resting the conduit therein.

Reverting now to FIGS. 1E and 1F, it is observed that during operation of the cutting tool 1, the cutting edge 24 of the cutting insert 20 comes in contact with a revolving workpiece WP at an interface zone IZ. The interface zone IZ can be defined to have a rake region which is associated with the rake face 26, and a relief region associated with the relief face 28 of the cutting insert 20.

The cutting tool 1 is configured for cooling the interface zone IZ using the two cooling apertures $CA_1$ and $CA_2$, as follows:

Cooling fluid emitted via the first branch 66 and through the first cooling aperture $CA_1$ is directed towards the revolving workpiece, so as to cool the relief region of the interface zone IZ;

Cooling fluid emitted via the second branch 68 and through the second cooling aperture $CA_2$ is directed towards the rake region so as to cool it.

It is understood that in the above described manner of operation, cooling fluid is provided directly to the interface zone IZ between the workpiece and the cutting insert 20, thereby facilitating efficient cooling thereof during operation of the cutting tool 1.

In addition, it is observed that the cooling fluid provided through the first cooling aperture $CA_1$ comes in contact with the workpiece, and, due to the revolution thereof, is quickly removed from the interface zone IZ. Thus, in each instant, a portion of the cooling fluid which was heated by the heat generated due to the cutting operation is being removed from the interface zone IZ, and the relief region of the interface zone IZ becomes free for receiving a new portion of cooling fluid.

Figure 6:
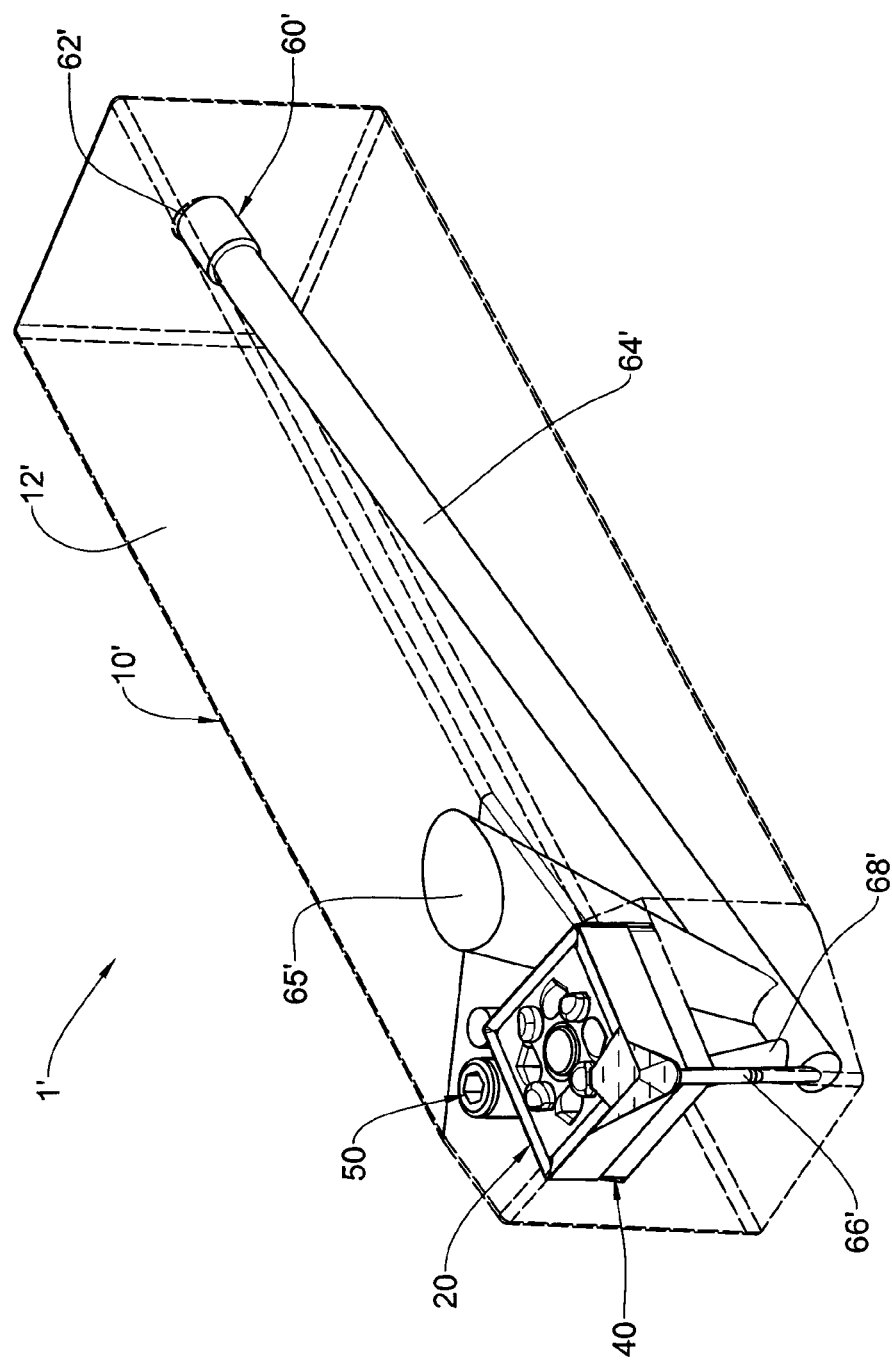
FIG. 6 is a schematic isometric view of another example of a turning tool holder according to the subject matter of the present application.

Referring now to FIG. 6, another example of a turning tool is shown, generally designated as 1'. The turning tool is generally similar to the turning tool 1 and therefore similar elements have been designated with similar reference numerals, with the addition of a prime (').

The difference between the two turning tools 1 and 1' lies in the design of the cutting tool holder 10 and 10' respectively. In the latter holder 10', the CFP system is of a slightly different design, as opposed to the previously described CFP system 60. The CFP system 60' has two inlets—62' and 65', the first being located similarly to the inlet 62 of the system 60, and the second one being located at the top of the cutting tool holder 10'.

It is observed that while the first inlet port 62' is generally similar to the inlet port 62 of the cutting tool holder 10, the second inlet port 65' is simply in the shape of a conical opening. This design allows an operator to simply place a nozzle of a fluid provision conduit within the inlet port 65', thereby eliminating the need for accurate fitting between the nozzle (not shown) and the inlet port 65'.

It is appreciated that in most cutting tools there is provided a semi-flexible cooling fluid conduit which may be arranged to become directed at the interface zone IZ during a cutting operation. The above design eliminates any need of modifying this conduit in order to fit the inlet port 62', and allows an operator to use it as is.

Figure 4A:
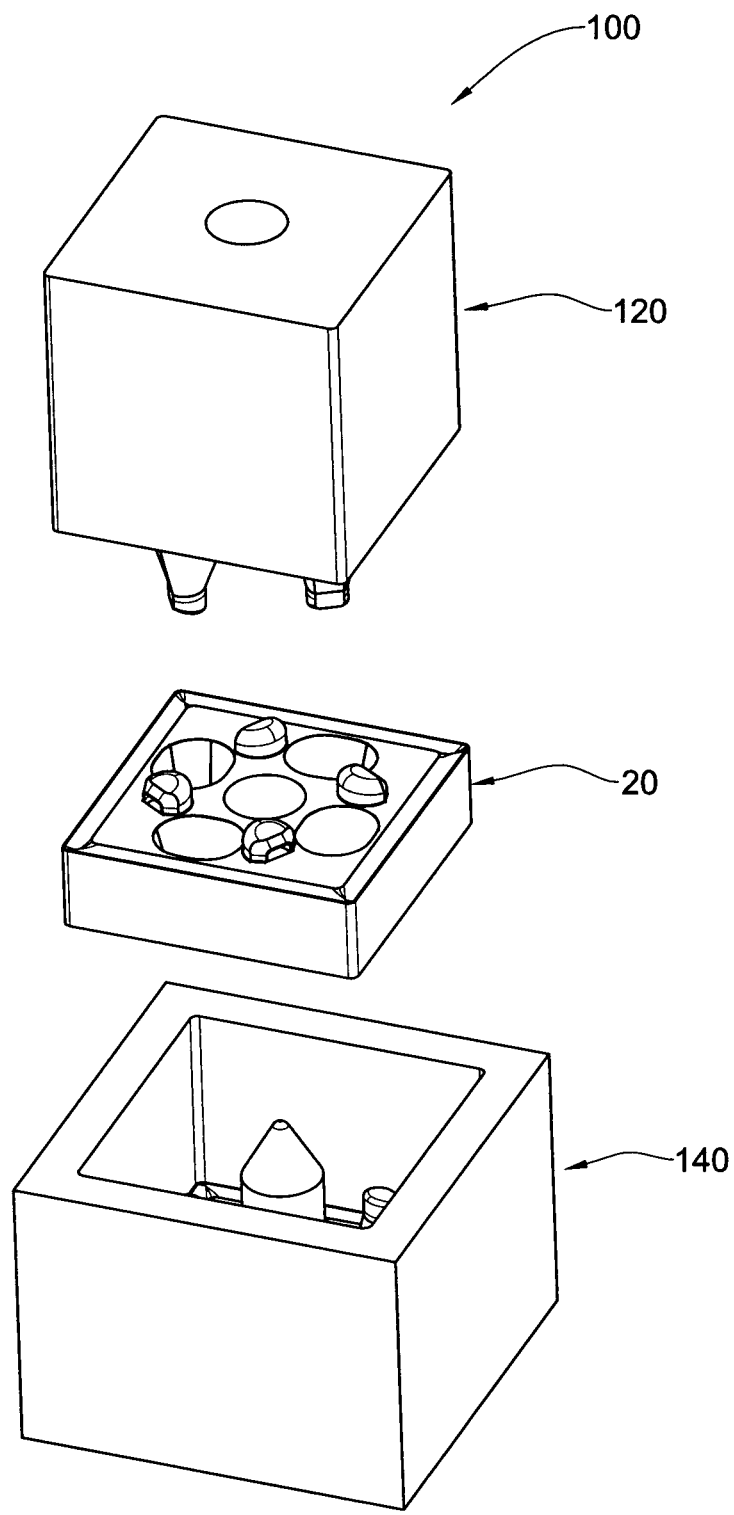
FIG. 4A is a schematic exploded isometric view of a mold configured for the manufacture of the cutting insert shown in FIGS. 2A to 2D.
Figure 4B:
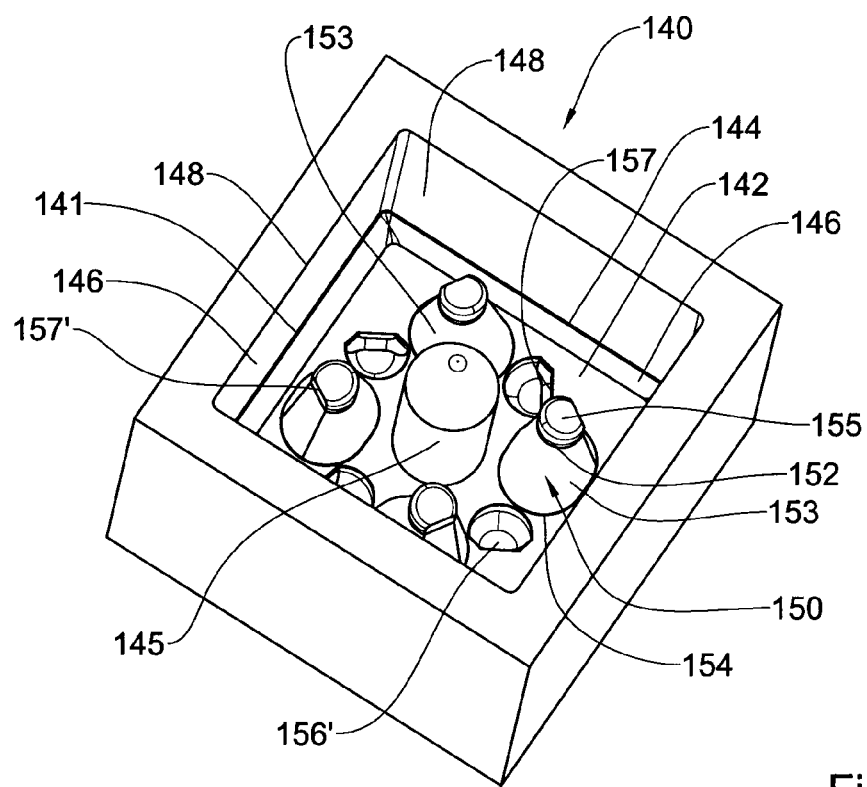
FIGS. 4B and 4C are schematic isometric views of the respective first and second part of the mold shown in FIG. 4A.
Figure 4C:
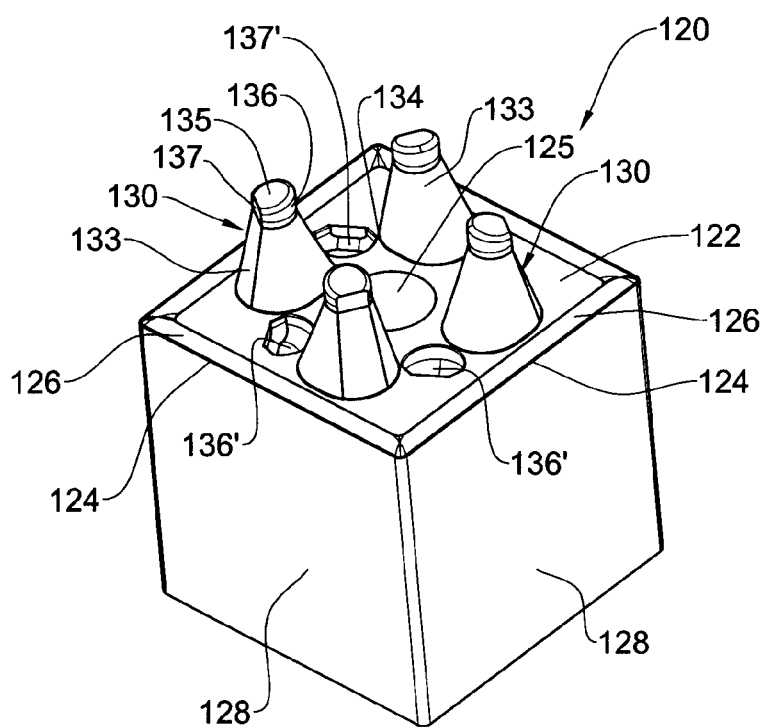

Returning now to FIGS. 4A to 4C, a mold for the manufacture of the cutting insert 20 is shown, generally designated as 100. The mold comprises a pressing member 120 and a cavity member 140.

The pressing member 120 comprises a body with a top surface 122 and four side surfaces 128 extending therefrom to form a generally cube-like shape. The top surface 122 is formed, at a boundary thereof with an elevated surface 126 configured to form the rake surface of the cutting insert 20.

The top surface 122 is further formed with four conical protrusions 130, configured for forming the channels 30 formed within the cutting insert 20. Each of the protrusions 130 has a bottom rim 134 at the top surface 122, and a top rim 136 elevated from the top surface 122, the rims 134, 136 corresponding in shape and dimension to the inlet 34 and 36 of the cooling channel 30 of the cutting insert 20.

In addition, the top surface 122 is also formed with four depressions 136', each configured for receiving a corresponding element of the cavity member 140, during manufacture of the cutting insert 20.

The cavity member 140 comprises a body with a central cavity 141 having a bottom surface 142 and four side walls 148 extending therefrom to form a generally cube-shaped cavity configured for receiving the pressing member 120. The bottom surface 142 is formed, at a boundary thereof with a depressed surface 146 configured to form the rake surface of the cutting insert 20.

The bottom surface 142 is further formed with four conical protrusions 150, configured for forming the channels 30 formed within the cutting insert 20. Each of the protrusions 150 has a bottom rim 154 at the bottom surface 142, and a top rim 156 elevated from the top surface 142, the rims 154, 156 corresponding in shape and dimension to the inlet 34 and 36 of the cooling channel 30 of the cutting insert 20.

In addition, the bottom surface 142 is also formed with four depressions 146', each configured for receiving a corresponding element of the cavity member 140, during manufacture of the cutting insert 20.

Figure 4D:
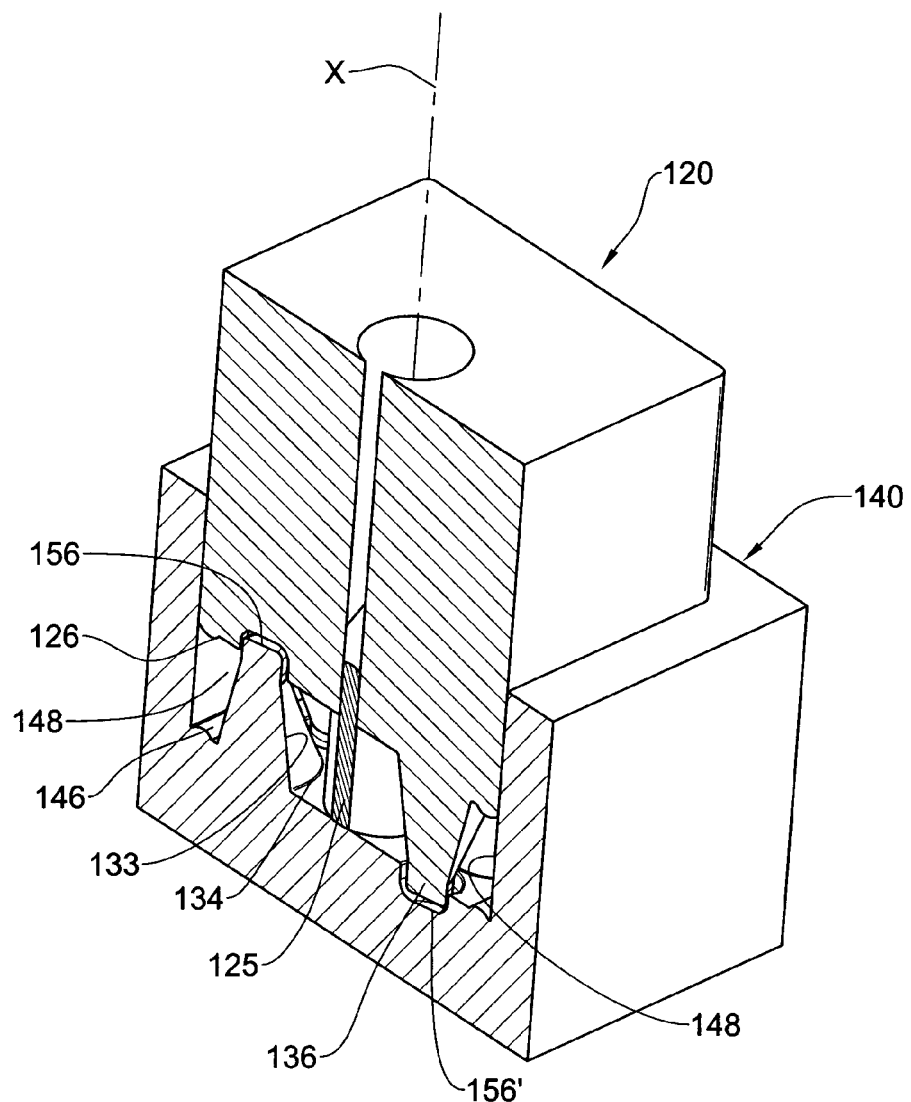
FIG. 4D is a schematic isometric cross-sectional view of the mold shown in FIG. 4A, with the insert being removed for clearer understanding of the inner structure of the mold.
Figure 4E:
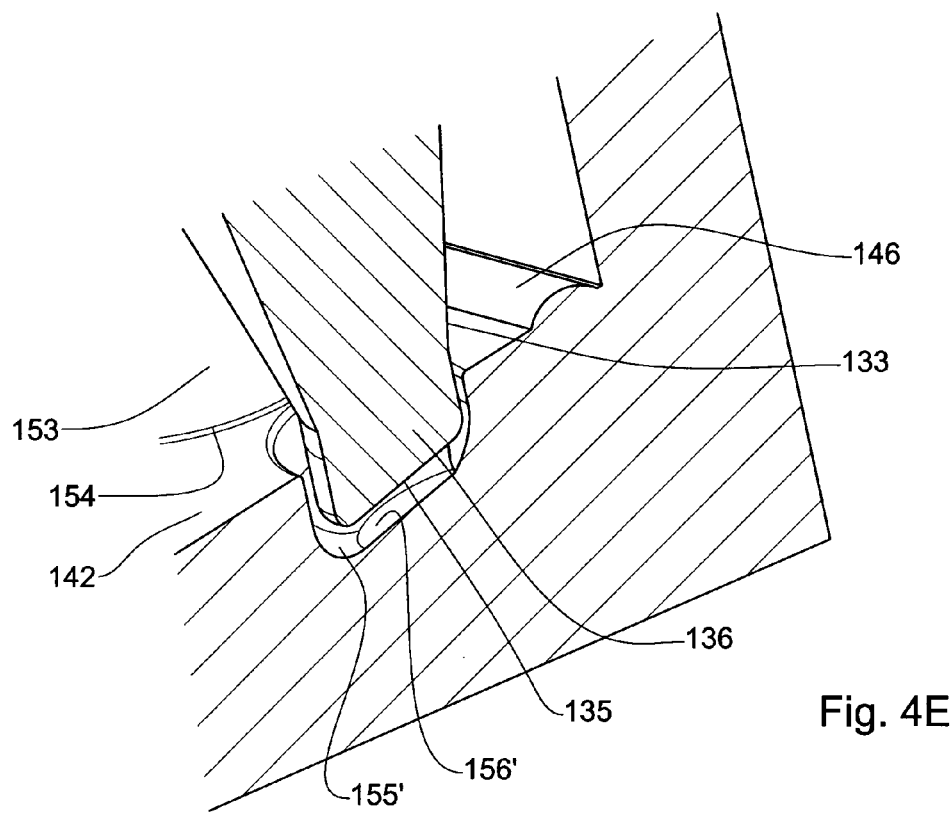
FIG. 4E is a schematic enlarged view of a detail C of the mold shown in FIG. 4B.
Figure 4F:
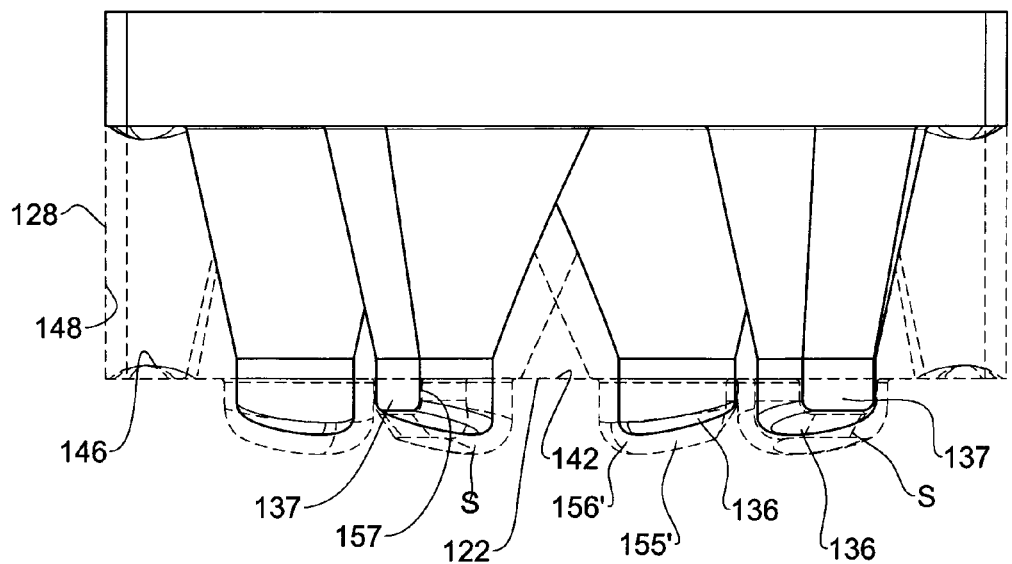
FIG. 4F is a schematic front view of the mold shown in FIG. 4A when the parts of the mold are engaged with one another, the first part being shown transparent for clearer understanding of the inner structure thereof.

With particular reference being drawn to FIGS. 4D to 4F, when the pressing member 120 is received within the cavity member 140, the side walls 128 and 148 of the respective members are mated against one another. In this position, the tips 136 of the conical protrusions 130 of the pressing member 120 are received within the depressions 156' of the cavity member 140 and the tips 156 of the conical protrusions 150 of the pressing member 140 are received within the depressions 136' of the cavity member 120. Thus, a space is formed between the two members 120, 140, which assumes the shape and dimension of the cutting insert 120.

It is observed that in the above described position, the top surface 135 of the conical protrusion 130 does not come in contact with the bottom surface of the depression 156' of the cavity member 140. The same holds true to the conical protrusions 150 of the cavity member 140 with respect to the pressing member 120.

However, in this position, the surfaces 137 of the conical protrusion 130 and 157 of the depressions 156' are mated against one another, so as to form the cooling aperture $CA_2$. The same holds true for the surfaces 137' and 157' of the pressing member 120 and cavity member 140.

Figure 5:
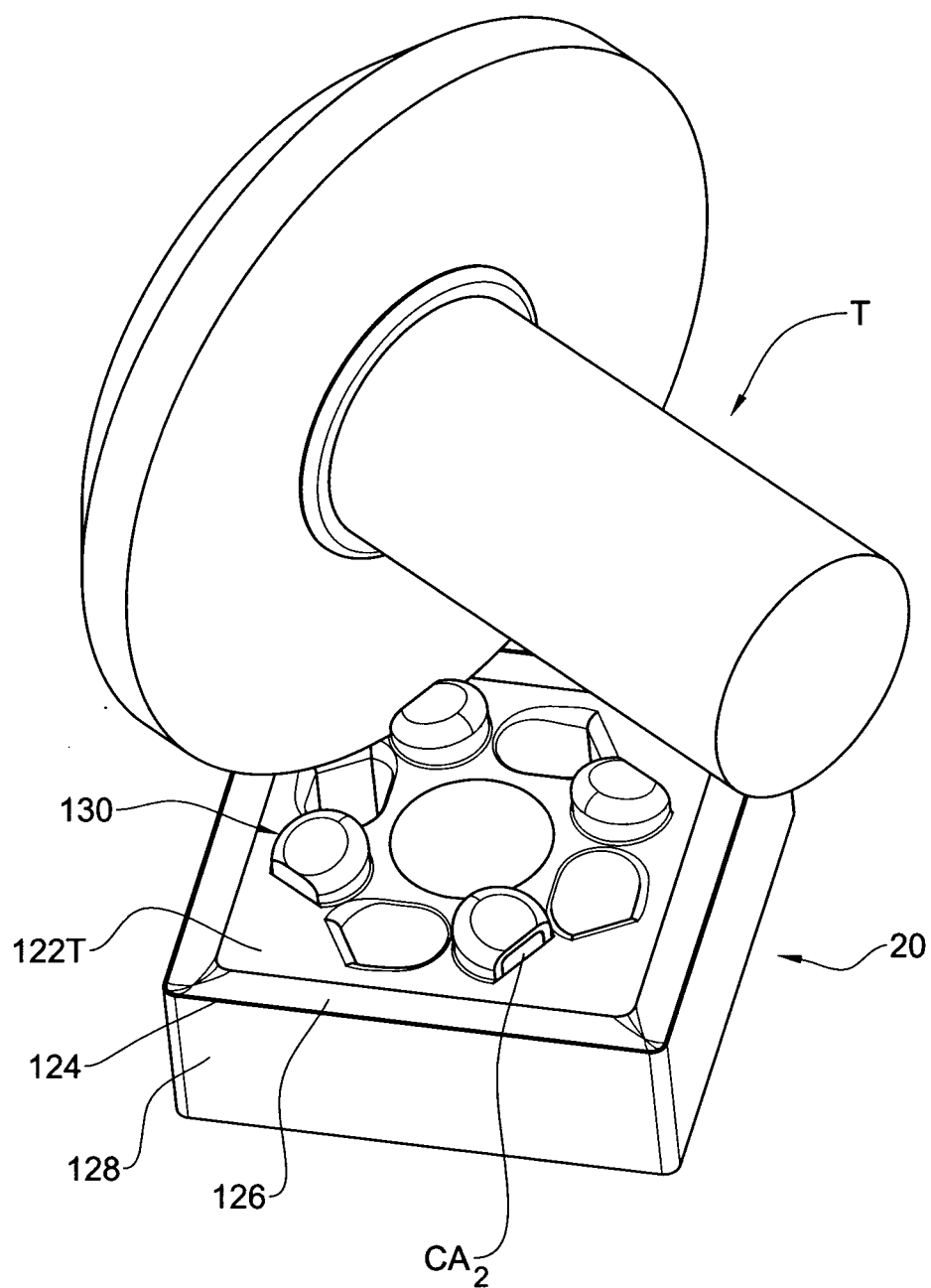
FIG. 5 is a schematic isometric view of the cutting insert shown in FIGS. 2A to 2D during final stages of manufacture thereof.

Once the cutting insert 20 is pressed and removed from the mold 100, an additional finishing operation can be performed as shown in FIG. 5. During this operation, the cooling apertures $CA_2$ are made sure to be open and functional.

The cutting insert 20 manufactured by the above mold 100 can be manufactured in a single pressing process. In addition, due to the symmetric nature of the mold parts 120, 140, the cutting insert 20 is fully reversible, and having eight cutting edges, four on each side.

Turning now to FIGS. 7A to 7F, a milling tool is shown, generally being designated as 200. The milling tool comprises a milling tool holder 210 and five cutting inserts 220. Similar elements to those described in connection with the turning tool 1 have been given similar reference numerals, upped by 200 (i.e. seat surface 14 in the turning tool 1 is now seat surface 214 in the milling tool 200).

The cutting inserts 220 used in the milling tool 200, i.e. the cutting insert 220 mounted onto the milling tool holder 210 are generally similar to the cutting inserts 20 previously described.

The milling tool holder 210 consequently comprises five insert seats, each configured for receiving a cutting insert 220. As opposed to the turning tool 1, the milling tool 200 does not comprise a support plate 40, and the cutting insert 220 are mounted directly onto the seat.

The milling tool holder 210 is also provided with a CFP system (not shown), configured for providing a cooling fluid to the interface zone IZ during a cutting operation.

Figure 7A:
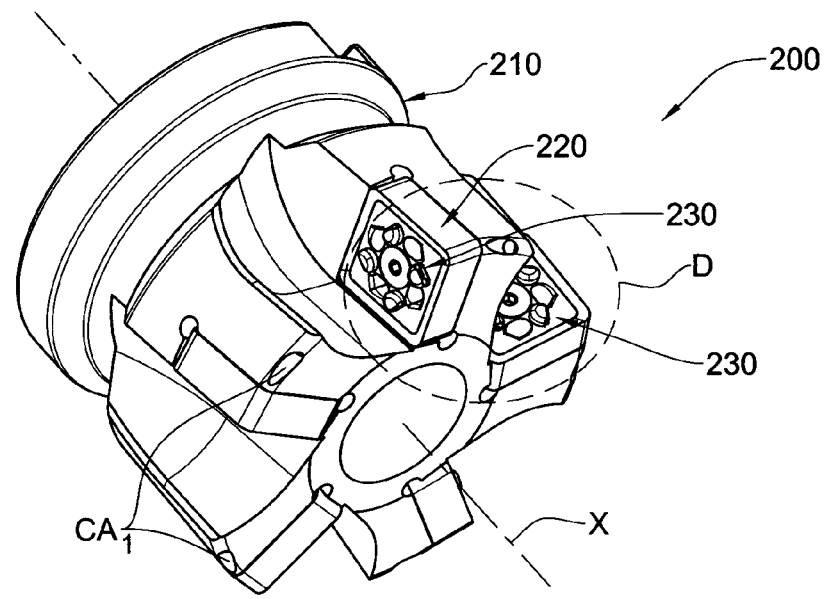
FIGS. 7A to 7C are schematic isometric, bottom and front views of a milling tool according to another example of the subject matter of the present application.
Figure 7B:
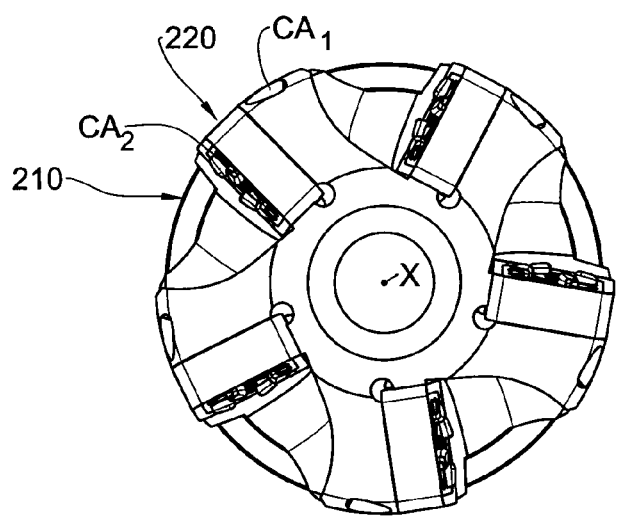
Figure 7C:
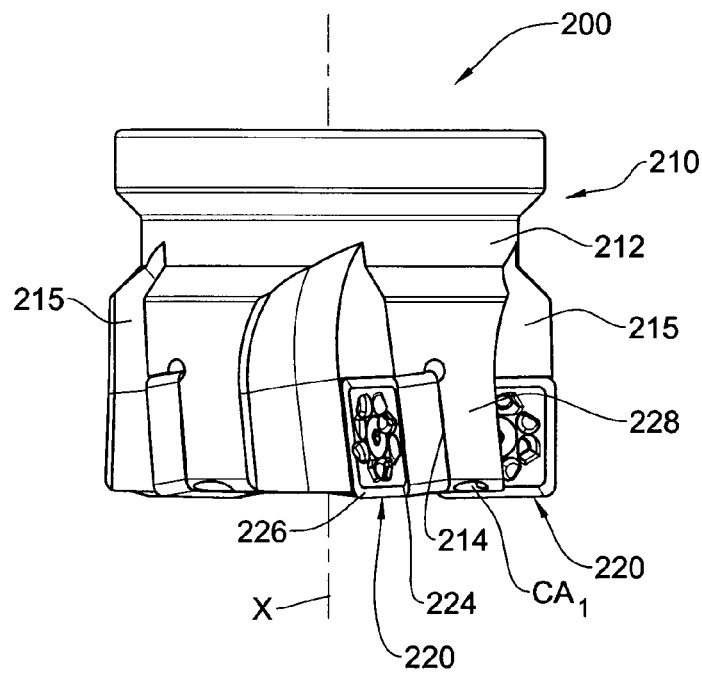
Figure 7D:
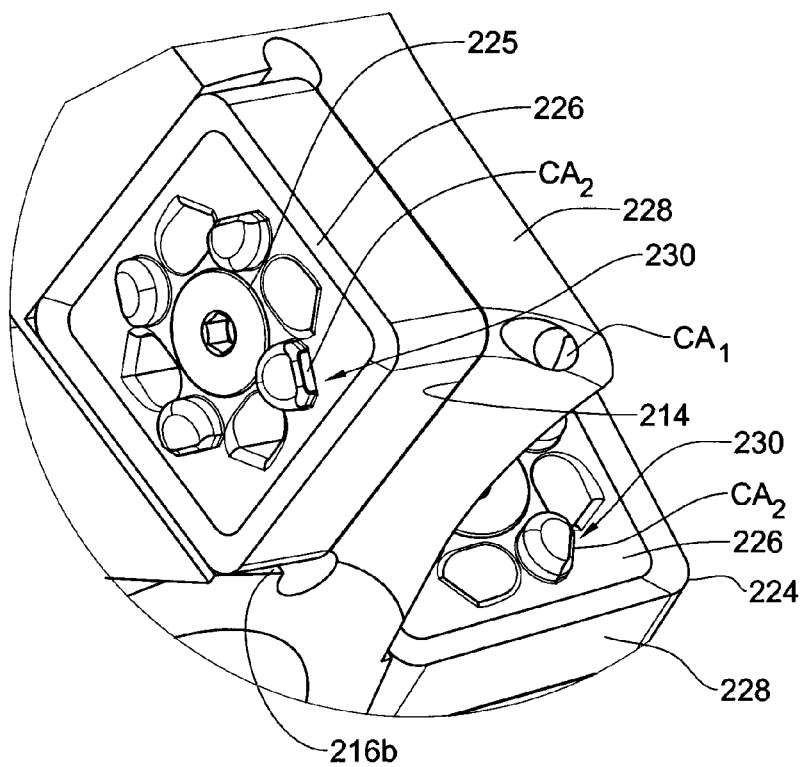
FIG. 7D is a schematic enlarged view of a detail D of the milling tool shown in FIG. 7A.
Figure 7E:
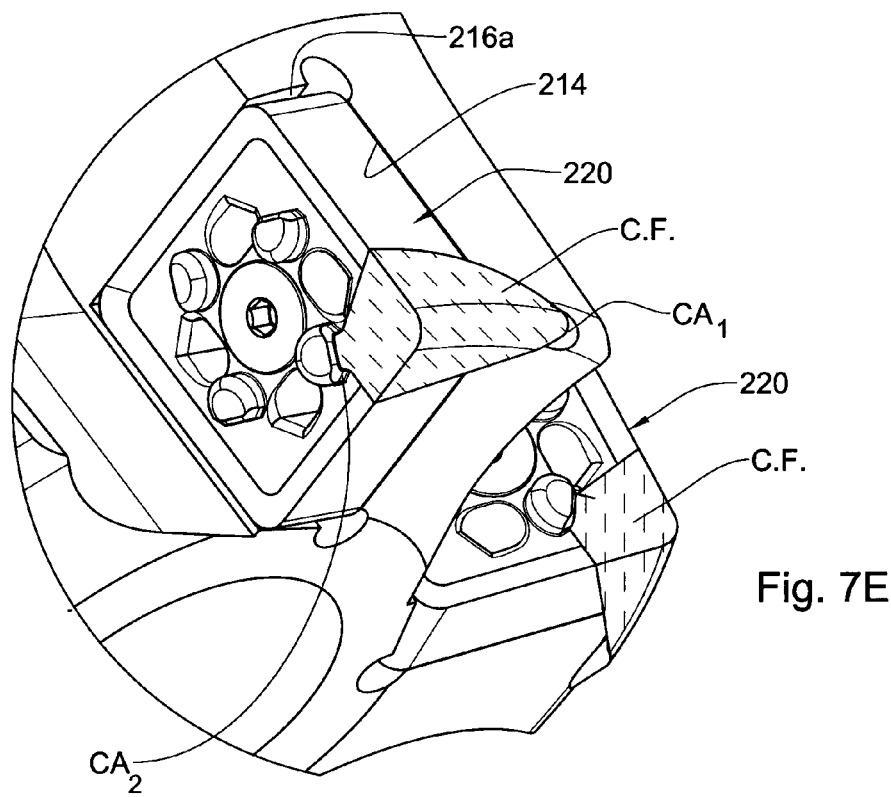
FIG. 7E is a schematic view of detail D shown in FIG. 7D, during a cooling operation thereof.
Figure 7F:
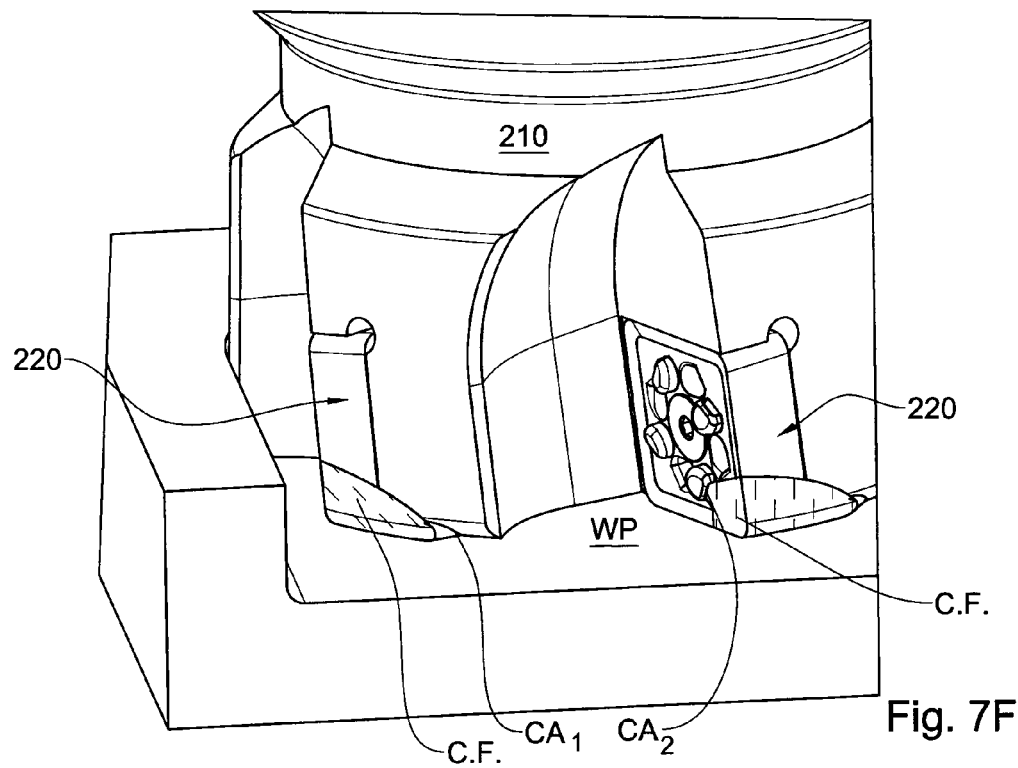
FIG. 7F is a schematic isometric view of the milling tool shown in FIGS. 7A to 7E, during a milling operation on a workpiece.
Figure 8A:
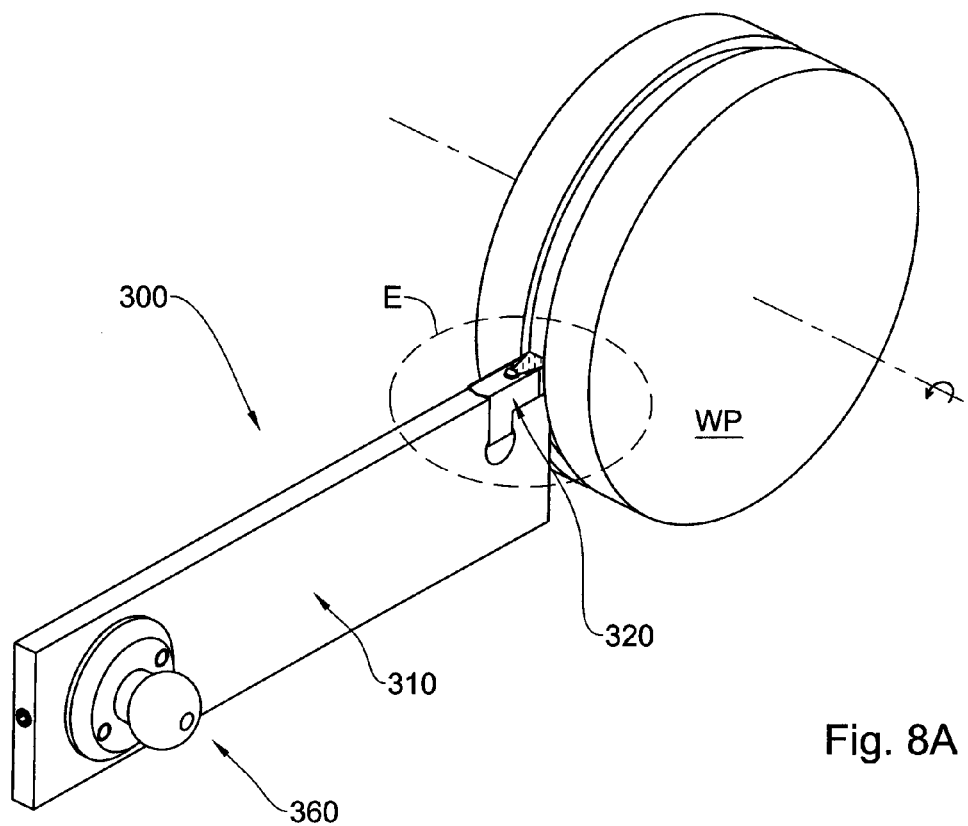
FIG. 8A is a schematic rear isometric view of a severing tool according to another example of the subject matter of the present application, shown during a severing operation on a workpiece.
Figure 8B:
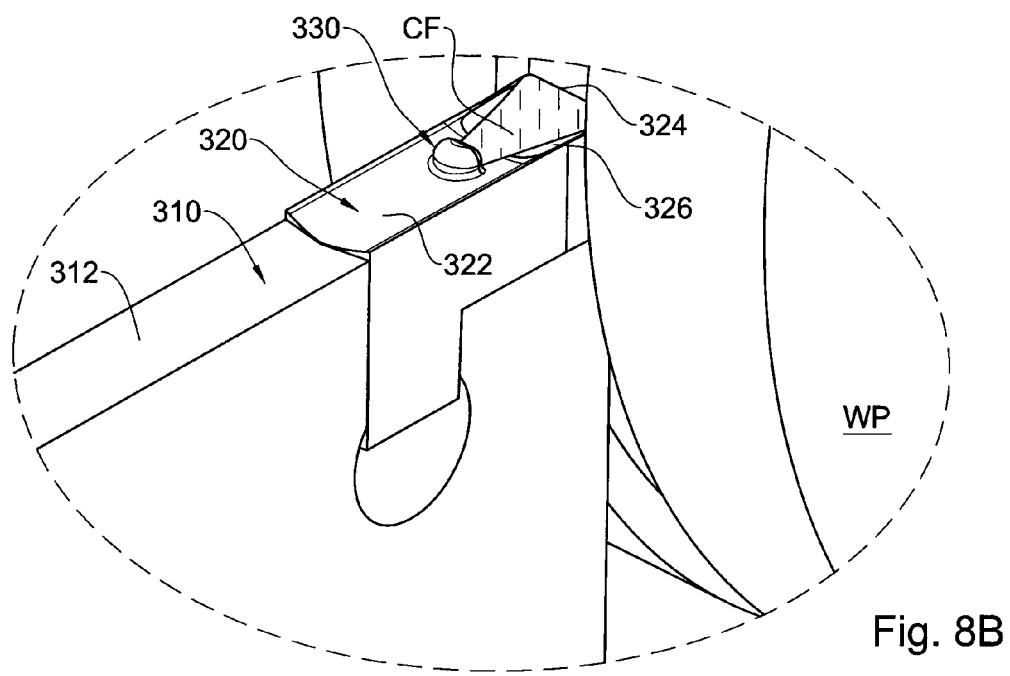
FIG. 8B is a schematic enlarged view of a detail E of the severing tool shown in FIG. 8A.

With particular reference to FIGS. 7D and 7E, the seat is also formed with a seat surface 214 and side surface 18a and 18b. The intersection edge E between the surfaces 18a, 18b is formed with a first cooling apertures $CA_1$, and the cutting insert 220 comprises nozzles 232, each having a second cooling aperture $CA_2$.

During a milling operation, cooling fluid is passed through the milling tool holder 210 and is provided to both the first and the second cooling aperture $CA_1$, $CA_2$. As a result, the manner of operation of the CFP system in the milling tool 200 is generally similar to that of the turning tool 1.

However, one difference between the turning tool 1 and the milling tool 200, is that due to rotation of the milling tool 200, the cooling fluid is propelled towards the workpiece at a greater relative velocity, thereby contributing to efficient cooling of the interface zone IZ during a cutting operation.

Turning now to FIGS. 8A to 9C, a severing tool is shown, generally designated as 300. The severing tool comprises a severing tool holder 310 and a cutting insert 320. Similar elements to those described in connection with the turning tool 1 have been given similar reference numerals, upped by 300 (i.e. seat surface 14 in the turning tool 1 is now seat surface 314 in the milling tool 300).

The severing tool holder 310 is formed with a seat configured for receiving therein the cutting insert 320, and is provided with a CFP system 360, configured for providing the cooling fluid to the interface zone IZ.

Similar to the turning tool 1, the severing tool holder 310 has a fluid inlet end 362 at an end remote form the interface zone IZ, and the channels 364, 366 and 368 pass through the holder 310 to reach the apertures $CA_1$ and $CA_2$.

The severing tool holder 310 is formed, at a surface facing the workpiece WP with a first cooling aperture $CA_1$, operating in a manner similar to that of the previously described cooling apertures.

Figure 9A:
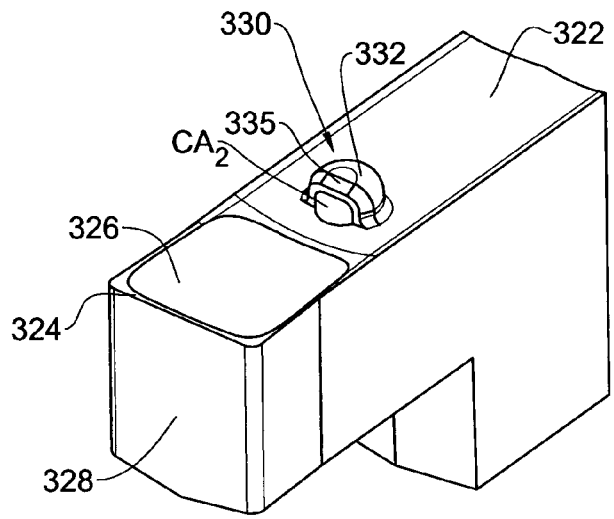
FIGS. 9A to 9C are schematic isometric, front and side views of a severing insert used in the severing tool shown in FIG. 8A.
Figure 9B:
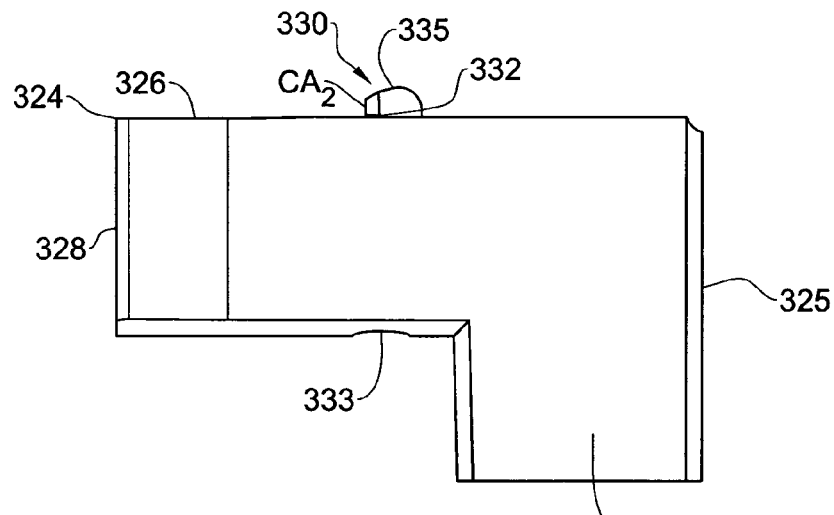
Figure 9C:
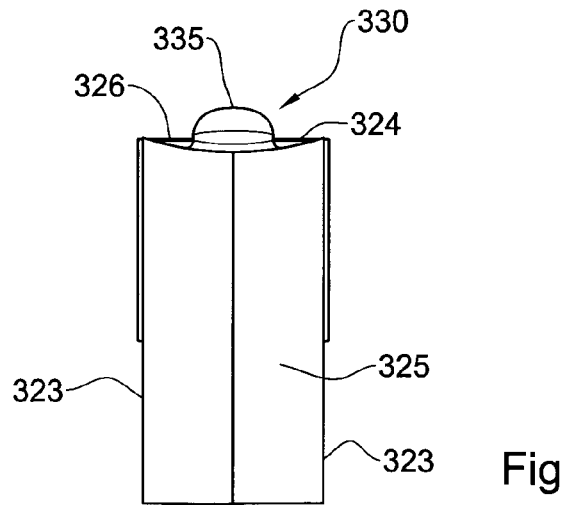

With specific reference to FIGS. 9A to 9C, the cutting insert 320 is formed with a cutting edge 324 defined between a rake surface 326 and a relief surface 328 of the cutting insert 320.

At a location remote from the rake surface 326, there is located a cooling channel 330, with a nozzle 332 projecting from the top of the insert 320. The nozzle 332 is located such that the rake surface 326 is disposed between the former and the cutting edge 324. The nozzle 332 has a second cooling aperture $CA_2$ facing the cutting edge 324 and configured for providing it with a cooling fluid.

It is noted that the cutting insert 320 receives the cooling fluid from the CFP system 360 via a hole 333 formed at the bottom of the cutting insert 320, which constitutes the inlet of the cooling channel. When the cutting insert 320 is mounted onto the severing tool holder 310, the cooling apertures 333 is aligned with the channel 368 $f$ the CFP system.

Figure 10A:
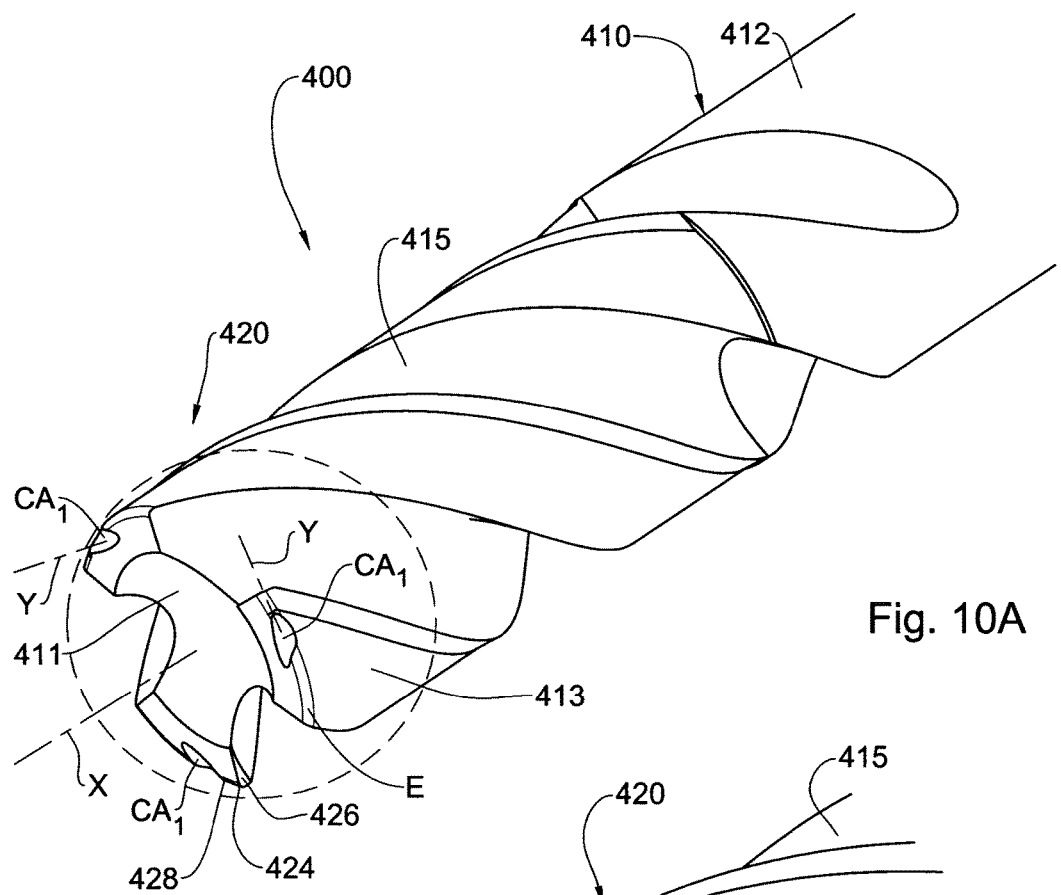
FIG. 10A is a schematic isometric view of a rough milling tool according to another example of the subject matter of the present application.
Figure 10B:
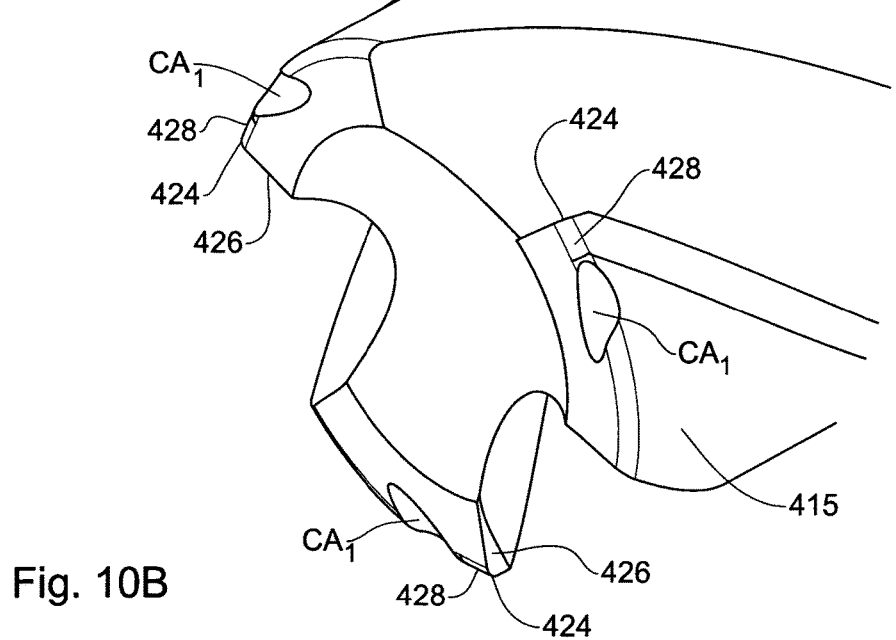
FIG. 10B is a schematic enlarged view of a detail G of the rough milling tool shown in FIG. 10A.

Turning now to FIGS. 10A and 10B, a rough milling tool is shown, generally designated as 400. Similar elements to those described in connection with the turning tool 1 have been given similar reference numerals, upped by 400 (i.e. cutting edge 24 in the turning tool 1 is now cutting edge 424 in the milling tool 400).

The rough milling tool 400 is an integral tool in the sense that it does not incorporate cutting inserts as the previously described cutting tools. Alternatively, it is integrally formed with three cutting edges 424, each cutting edge 424 having a relief surface 428 and a rake surface 426.

The milling tool 400 is further formed with three spiraling channels 415 configured for evacuating material removed from the workpiece during the cutting operation.

The milling tool 400 has a central axis X, a bottom surface 411 oriented perpendicular to the central axis X and an envelope surface 413 extending about the central axis X. At the interface between the bottom surface 411 and the envelope surface 413, there is formed an edge E.

The edge E is formed, at a location slightly spaced from the cutting edge 424, with a cooling aperture $CA_1$, which serves the same function as the previously described first apertures, i.e. providing a cooling fluid directly to the relief region of the interface zone IZ during a cutting operation.

Provision of the cooling fluid to the cooling apertures $CA_1$ is performed via a CFP system constituted by channels (not shown) passing through the milling tool 400.

Figure 11A:
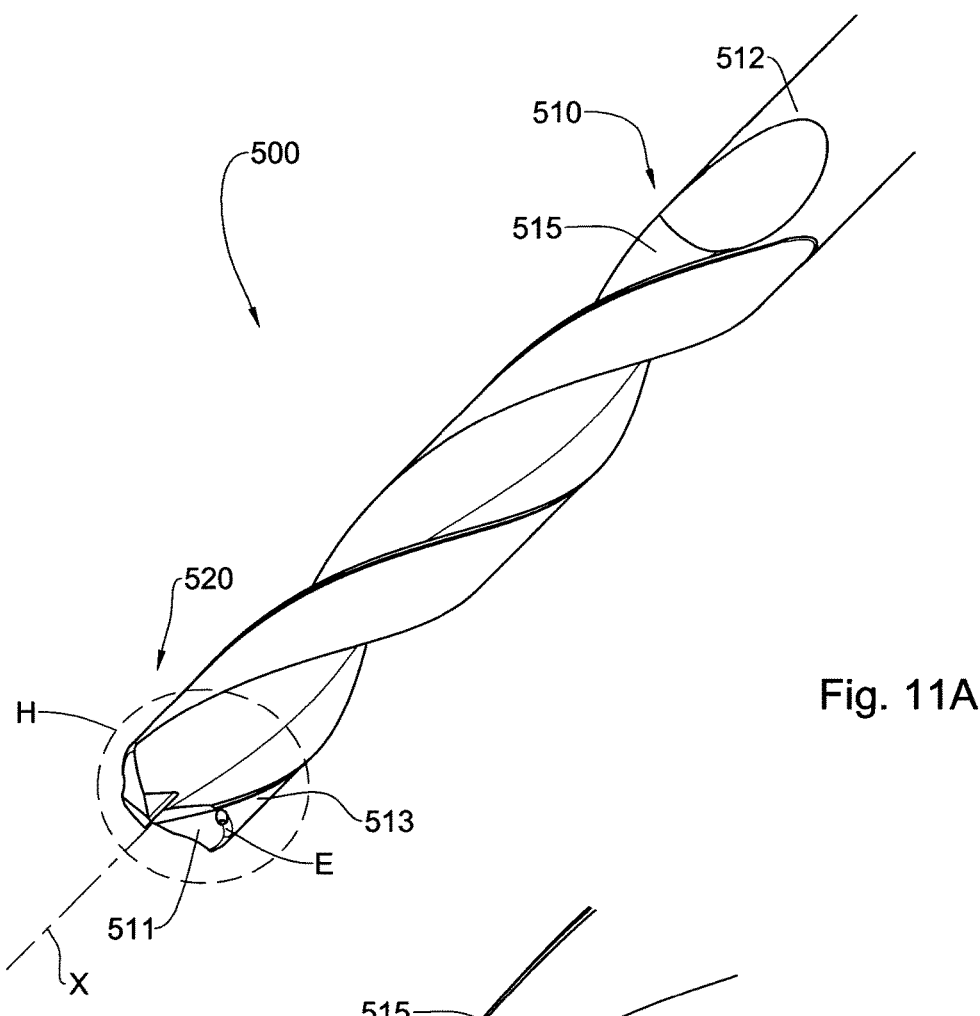
FIG. 11A is a schematic isometric view of a drilling tool according to another example of the subject matter of the present application.
Figure 11B:
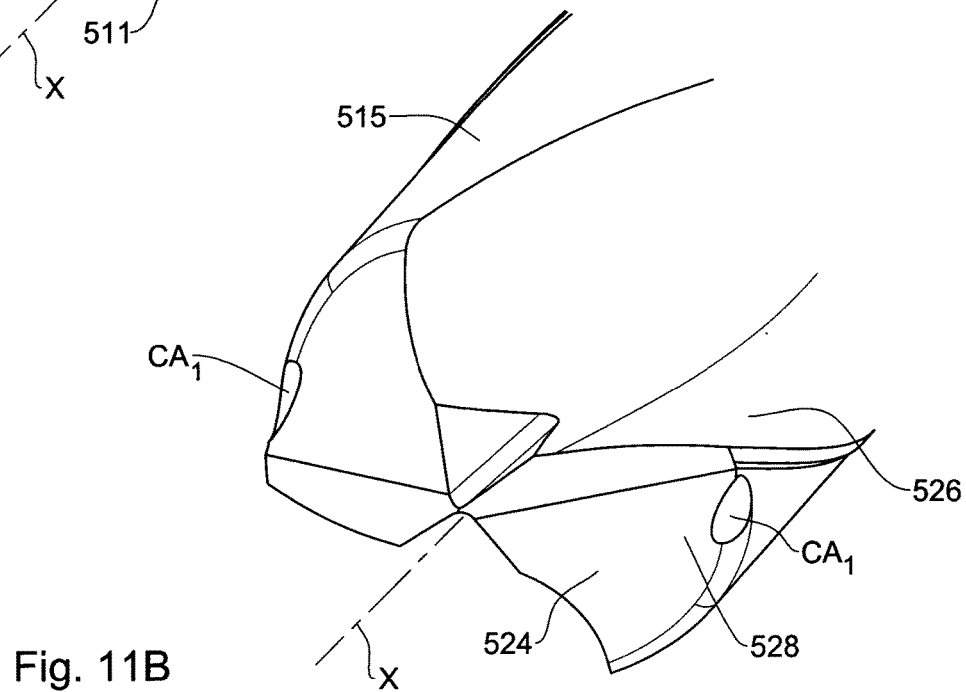
FIG. 11B is a schematic enlarged view of a detail H of the drilling tool shown in FIG. 11A.

Turning now to FIGS. 11A and 11B, a drilling tool is shown, generally designated as 500. Similar elements to those described in connection with the turning tool 1 have been given similar reference numerals, upped by 500 (i.e. cutting edge 24 in the turning tool 1 is now cutting edge 524 in the drilling tool 500).

The drilling tool 500, similar to the rough milling tool 400, is an integral tool in the sense that it does not incorporate cutting inserts as the previously described cutting tools. Alternatively, it is integrally formed with three cutting edges 524, each cutting edge 524 having a relief surface 528 and a rake surface 526.

The drilling tool 500 is further formed with two spiraling channels 515 configured for evacuating material removed from the workpiece during the cutting operation.

The drilling tool 500 has a central axis X and a bottom surface 511 oriented perpendicular to the central axis X and an envelope surface 513 extending about the central axis X. At the interface between the bottom surface 511 and the envelope surface 513, there is formed an edge E.

The edge E is formed, at a location slightly spaced from the cutting edge 524, with a cooling aperture $CA_1$, which serves the same function as the previously described first apertures, i.e. providing a cooling fluid directly to the relief region of the interface zone IZ during a cutting operation.

Those skilled in the art to which this invention pertains will readily appreciate that numerous changes, variations, and modification can be made without departing from the scope of the invention, mutatis mutandis.

The invention claimed is:

1. A cutting element comprising top and bottom faces and at least one side face extending therebetween, a cutting portion and a cooling portion, said cutting portion having a rake surface on at least one of said top and bottom faces, a relief surface on said side face, and a cutting edge defined at the intersection between the rake surface and the relief surface, said cooling portion comprising:
   a portion of at least one of the top and bottom faces other than the rake surface, disposed at a location more remote from the cutting edge than the rake surface and constituting an operative surface; and
   a cooling nozzle integrally formed therewith and having a cooling aperture directed at the cutting edge at an acute angle with respect to the rake surface, said rake surface being disposed between the cutting edge and the cooling aperture;
   wherein said cooling nozzle is constituted by at least one side wall extending traverse to said operative surface and an upper face extending traverse to said at least one side wall so that said cooling aperture is delimited by said operative surface, said at least one side wall, and said upper face; and
   wherein said cutting element is further formed with a cooling channel extending between said bottom face and said top face and being in fluid communication with said nozzle for provision of a cooling fluid thereto.

2. The cutting element according to claim 1, wherein said upper face of the cooling nozzle is angled with respect to said operative surface at an acute angle such that cooling fluid emitted from said nozzle is emitted towards said operative surface.

3. The cutting element according to claim 1, wherein said cutting element is formed with two or more cutting portions and two or more cooling portions having respective nozzles associated with some of said cutting portions.

4. The cutting element according to claim 3, wherein said cutting element has a number n of cutting portions and a respective number of cutting edges, each cutting portions being associated with at least one cooling portion and its respective nozzle.

5. The cutting element according to claim 4, wherein said cutting element is formed with four cutting edges and four respective nozzles.

6. The cutting element according to claim 1, wherein said cutting element is a cutting insert configured for mounting onto a cutting tool holder to form a cutting tool.

7. The cutting element according to claim 6, wherein said cutting insert is indexible.

8. The cutting element according to claim 6, wherein said cutting insert is reversible.

9. The cutting element according to claim 8, wherein said cutting insert is formed with at least one cutting portion associated with a top face thereof and at least one cutting portion associated with a bottom face thereof, each of the cutting portions being provided with its respective cooling portion and corresponding nozzle.

10. The cutting element according to claim 9, wherein said cutting insert has a first nozzle formed at the top face thereof and having a respective cooling channel extending between said bottom face and said top face and a second nozzle formed at a bottom face of the cutting insert having a respective cooling channel extending between the top face and the bottom face.

11. The cutting element according to claim 6, wherein said cutting insert has four cutting portions at an top face thereof and four cutting portions at a bottom face thereof, each of the cutting portions being provided with its respective cooling portion and nozzle.

12. The cutting element according to claim 1, wherein said cutting element is configured for at least one of the following cutting operations: milling, turning, or sawing.

13. The cutting element according to claim 1, wherein said cutting element is manufactured by a single pressing process.

14. A cutting tool comprising the cutting element according to claim 1 mounted to a cutting tool holder, said cutting tool holder being formed with an insert seat and a cooling fluid provision arrangement having at least one cooling passage in fluid communication with said insert seat.

* * * * *